United States Patent
Takeda et al.

(10) Patent No.: US 12,108,408 B2
(45) Date of Patent: Oct. 1, 2024

(54) PROVIDING CROSS-CARRIER SCHEDULING CONTROL INFORMATION FOR A PRIMARY CELL VIA BOTH A SECONDARY CELL AND THE PRIMARY CELL

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Wanshi Chen, San Diego, CA (US); Tao Luo, San Diego, CA (US); Jing Sun, San Diego, CA (US); Juan Montojo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/458,056

(22) Filed: Aug. 26, 2021

(65) Prior Publication Data
US 2022/0110149 A1   Apr. 7, 2022

Related U.S. Application Data

(60) Provisional application No. 63/086,472, filed on Oct. 1, 2020.

(51) Int. Cl.
*H04W 72/23* (2023.01)
*H04L 5/14* (2006.01)

(52) U.S. Cl.
CPC ............. *H04W 72/23* (2023.01); *H04L 5/14* (2013.01)

(58) Field of Classification Search
CPC ..... H04W 72/23; H04W 72/12; H04W 72/21; H04L 5/14; H04L 5/1469; H04L 5/0053; H04L 5/001
See application file for complete search history.

(56) References Cited

U.S. PATENT DOCUMENTS

2012/0257551 A1*  10/2012  Diao ..................... H04W 72/51
                                                                 370/280
2019/0215871 A1*   7/2019  Aiba ..................... H04W 48/16
(Continued)

OTHER PUBLICATIONS

Etri: "Discussion on Cross-Carrier Scheduling for NR DSS", 3GPP Draft, R1-2006362, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), 3 Pages, XP051915332, Retrieved from the Internet: URL: https://ftp.3gpp.org/tsg_ran/WG1_RL1/TSGR1_102-e/Docs/R1-2006362.zip, R1-2006362 Discussion on cross-carrier scheduling for NR DSS—final.docx [retrieved on Aug. 7, 2020] paragraph [0002]; table 1.
(Continued)

*Primary Examiner* — Mohamed A Kamara
(74) *Attorney, Agent, or Firm* — QUALCOMM Incorporated

(57) ABSTRACT

Methods, systems, and devices for wireless communications are described. In some implementations, a method for wireless communication at a user equipment (UE) is described that includes identifying that the UE is in carrier aggregation communication with a primary and secondary cell. The method may also include monitoring, during one or more time intervals, UE-specific search spaces of the secondary cell for control information scheduling data communications on the primary cell. The method may include switching, during one or more different time intervals, to monitoring UE-specific search spaces of the primary cell. Another
(Continued)

method describes wireless communication at a base station that may configure a UE to communicate via carrier aggregation, transmit control information via the secondary cell to the UE during downlink TTIs, and transmit control information via the primary cell to the UE during uplink TTIs.

31 Claims, 18 Drawing Sheets

(56) References Cited

U.S. PATENT DOCUMENTS

| | | | | |
|---|---|---|---|---|
| 2021/0168774 | A1* | 6/2021 | Li | H04L 5/0053 |
| 2021/0307102 | A1* | 9/2021 | Babaei | H04W 36/305 |
| 2023/0026760 | A1* | 1/2023 | Takeda | H04L 5/0094 |
| 2023/0084554 | A1* | 3/2023 | Shi | H04L 5/001 370/329 |
| 2023/0284205 | A1* | 9/2023 | Nory | H04L 5/001 370/329 |
| 2024/0080850 | A1* | 3/2024 | Yi | H04W 80/02 |

OTHER PUBLICATIONS

Huawei., et al., Remaining Details for Cross-Carrier Scheduling with Different Numerologies, R1-1906017, 3GPP TSG RAN WG1 Meeting #97 May 17, 2019(May 17, 2019), 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727474, 8 Pages, http://www.3gpp.org/ftp/Meetings%5F3GPP%5FSYNC/RAN1/Docs/R1%2D1906017%2Ezip [retrieved on May 13, 2019], paragraph [0002], Whole document.

Huawei., et al., "Discussion on the PDCCH of SCell Scheduling POSCH or PUSCH on P(S)Cell", 3GPP TSG RAN WG1 Meeting #102-e, 3GPP Draft, R1-2006405, 3rd Generation Partnership Project (3GPP), Mobile Competence Centre, 650, Route Des Lucioles, F-06921 Sophia-Antipolis Cedex, France, No. E-meeting, Aug. 17, 2020-Aug. 28, 2020, Aug. 8, 2020 (Aug. 8, 2020), 4 Pages, XP051918017, Retrieved from the Internet: URL: https://ftp.3gpp.org/tsg_ran/WG1_RL1/TSGR1_102-e/Docs/R1-2006405.zip, R1-2006405.docx [retrieved on Aug. 8, 2020], paragraph [0002].

International Search Report and Written Opinion—PCT/US2021/047968—ISA/EPO—Dec. 21, 2021.

Nec: "On Support of DL and UL Cross-Carrier Scheduling in TDD-FDD CA", 3GPP TSG RAN WG1 Meeting #75, 3GPP Draft, R1-135835_TDD-FDD_CA, 3rd Generation Partnership Project (3GPP), Mobile Competence Centre, 650, Route Des Lucioles, F-06921 Sophia-Antipolis Cedex, France, vol. RAN WG1, No. San Francisco, USA, Nov. 11, 2013-Nov. 15, 2013, Nov. 13, 2013 (Nov. 13, 2013), pp. 1-6, XP050735473, Retrieved from the Internet: URL: http://www.3gpp.org/ftp/Meetings_3GPP_SYNC/RAN/RAN1/Docs/, [retrieved on Nov. 13, 2013] paragraph [0002].

Potevio: "Consideration on Simultaneous tx/rx on Different Bands with Different UL-DL Configurations", 3GPP TSG RAN WG1 Meeting #66bis, 3GPP Draft, R1-113024 Consideration on Simultaneous tx/rx on Different Bands with Different UL-DL Configurations, 3rd Generation Partnership Project (3GPP), Mobile Competence Centre, 650, Route Des Lucioles, F-06921 Sophia-Antipolis Cedex, France, vol. RAN WG1, No. Zhuhai, Oct. 20, 2011, Oct. 3, 2011 (Oct. 3, 2011), 7 Pages, XP050538063, [retrieved on Oct. 3, 2011] paragraph [0002]—paragraph [2.2.3].

Vivo: "Discussion on Scell scheduling P (S) cell", 3GPP TSG RAN WG1 #102-e, 3GPP Draft, R1-2005409, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), 4 Pages, XP051917434, Retrieved from the Internet: URL: https://ftp.3gpp.org/tsg_ran/WG1_RL1/TSGR1_102-e/Docs/R1-2005409.zip, R1-2005409 Discussion on Scell scheduling Pcell.docx [retrieved on Aug. 8, 2020] Paragraph [0002].

Zte: "Discussion on Cross-Carrier Scheduling from SCell to PCell", 3GPP TSG RAN WG1 Meeting #102-e, 3GPP Draft, R1-2005440, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), 5 Pages, XP051917465, Retrieved from the Internet: URL: https://ftp.3gpp.org/tsg_ran/WG1_RL1/TSGR1_102-e/Docs/R1-2005440.zip, R1-2005440 Discussion on Cross-Carrier Scheduling from SCe11 to PCe11.docx [retrieved on Aug. 8, 2020], Paragraph [0002].

* cited by examiner

PROVIDING CROSS-CARRIER SCHEDULING CONTROL INFORMATION FOR A PRIMARY CELL VIA BOTH A SECONDARY CELL AND THE PRIMARY CELL

CROSS REFERENCE

The present Application for Patent claims the benefit of U.S. Provisional Patent Application No. 63/086,472 by TAKEDA et al., entitled "PROVIDING CROSS-CARRIER SCHEDULING CONTROL INFORMATION FOR A PRIMARY CELL VIA BOTH A SECONDARY CELL AND THE PRIMARY CELL," filed Oct. 1, 2020, assigned to the assignee hereof, and expressly incorporated by reference herein.

FIELD OF TECHNOLOGY

The following relates to wireless communications, including providing cross-carrier scheduling control information for a primary cell via both a secondary cell and the primary cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In NR, cross-carrier scheduling during carrier aggregation may be enabled. For example, control information for scheduling a data transmission on a primary cell (PCell) may be transmitted to a UE on a secondary cell (SCell). In general, this means that a UE that is configured to communicate via carrier aggregation on both a PCell and an SCell may monitor the SCell for UE-specific search spaces that include downlink control information (DCI) pertaining to the data transmission on the PCell. This is a form of cross-carrier scheduling. However, cross-carrier scheduling may not work for all configurations due to the UE being unable to monitor for downlink information during uplink symbols.

SUMMARY

The described techniques relate to improved methods, systems, devices, and apparatuses that support providing cross-carrier scheduling control information for a primary cell via both a secondary cell and the primary cell. Generally, the described techniques allow for transmission of the scheduling DCI within UE-specific search spaces of a primary cell during at least the uplink symbols of a secondary cell in cross-carrier scheduling carrier aggregation scenarios. A monitoring UE may monitor the secondary cell during downlink symbols (and other non-uplink symbols) but may switch and monitor the primary cell during the uplink symbols. The network may transmit the scheduling DCI on the primary cell during the uplink symbols but could also transmit the scheduling DCI on both the secondary cell and the primary cell during non-uplink symbols. The frequency of transmission may be dictated by the physical downlink control channel (PDCCH) monitoring occasions of either the primary cell or the secondary cell. In one alternative, the frequency of DCI transmission on the secondary cell will be based on the PDDCH monitoring occasions of the primary cell. Alternatively, the frequency of DCI transmission on the primary cell will be based on the PDCCH monitoring occasions of the secondary cell.

A method of wireless communication at a UE is described. The method may include identifying that the UE is in carrier aggregation communication with a primary cell and a secondary cell, where the secondary cell is configured for time division duplex communications in accordance with an uplink-downlink configuration. The method may also include monitoring, during downlink transmission time intervals of the uplink-downlink configuration, UE-specific search spaces of the secondary cell for control information scheduling data communications on the primary cell. The method may also include switching, during uplink transmission time intervals of the uplink-downlink configuration, from monitoring the UE-specific search spaces of the secondary cell to monitoring UE-specific search spaces of the primary cell for the control information scheduling the data communications on the primary cell.

An apparatus for wireless communication at a UE is described. The apparatus may include a processor, memory coupled with the processor, and instructions stored in the memory. The instructions may be executable by the processor to cause the apparatus to identify that the UE is in carrier aggregation communication with a primary cell and a secondary cell, where the secondary cell is configured for time division duplex communications in accordance with an uplink-downlink configuration. The instructions may also cause the apparatus to monitor, during downlink transmission time intervals of the uplink-downlink configuration, UE-specific search spaces of the secondary cell for control information scheduling data communications on the primary cell. The instructions may cause the apparatus to switch, during uplink transmission time intervals of the uplink-downlink configuration, from monitoring the UE-specific search spaces of the secondary cell to monitoring UE-specific search spaces of the primary cell for the control information scheduling the data communications on the primary cell.

Another apparatus for wireless communication at a UE is described. The apparatus may include means for identifying that the UE is in carrier aggregation communication with a primary cell and a secondary cell, where the secondary cell is configured for time division duplex communications in accordance with an uplink-downlink configuration. The apparatus may include means for monitoring, during downlink transmission time intervals of the uplink-downlink configuration, UE-specific search spaces of the secondary cell for control information scheduling data communications on the primary cell. The apparatus may include means for switching, during uplink transmission time intervals of the uplink-downlink configuration, from monitoring the UE-specific search spaces of the secondary cell to monitoring UE-specific search spaces of the primary cell for the control information scheduling the data communications on the primary cell.

A non-transitory computer-readable medium storing code for wireless communication at a UE is described. The code may include instructions executable by a processor to identify that the UE is in carrier aggregation communication with a primary cell and a secondary cell, where the secondary cell is configured for time division duplex communications in accordance with an uplink-downlink configuration. The code may include instructions executable by a processor to monitor, during downlink transmission time intervals of the uplink-downlink configuration, UE-specific search spaces of the secondary cell for control information scheduling data communications on the primary cell. The code may also include instructions executable by a processor to switch, during uplink transmission time intervals of the uplink-downlink configuration, from monitoring the UE-specific search spaces of the secondary cell to monitoring UE-specific search spaces of the primary cell for the control information scheduling the data communications on the primary cell.

Some examples of the method, apparatuses, and non-transitory computer-readable medium described herein may further include operations, features, means, or instructions for monitoring the UE-specific search spaces of the primary cell for the control information in accordance with a PDCCH monitoring occasion of the secondary cell.

In some examples of the method, apparatuses, and non-transitory computer-readable medium described herein, monitoring the UE-specific search spaces of the secondary cell may include operations, features, means, or instructions for monitoring the UE-specific search spaces of the secondary cell in accordance with a PDCCH monitoring occasion of the primary cell.

Some examples of the method, apparatuses, and non-transitory computer-readable medium described herein may further include operations, features, means, or instructions for monitoring the UE-specific search spaces of the primary cell for the control information in accordance with a PDCCH monitoring occasion of the primary cell.

In some examples of the method, apparatuses, and non-transitory computer-readable medium described herein, monitoring the UE-specific search spaces of the secondary cell may include operations, features, means, or instructions for monitoring the UE-specific search spaces of the secondary cell in accordance with a PDCCH monitoring occasion of the secondary cell.

In some examples of the method, apparatuses, and non-transitory computer-readable medium described herein, the control information may be available to be monitored by the UE via only the primary cell during the uplink transmission time intervals of the uplink-downlink configuration.

In some examples of the method, apparatuses, and non-transitory computer-readable medium described herein, the control information may be available to be monitored by the UE via both the primary cell and the secondary cell during the downlink transmission time intervals of the uplink-downlink configuration. In some examples of the method, apparatuses, and non-transitory computer-readable medium described herein, the control information may be available to be monitored by the UE via at least the secondary cell during non-uplink transmission time intervals of the uplink-downlink configuration.

Some examples of the method, apparatuses, and non-transitory computer-readable medium described herein may further include operations, features, means, or instructions for receiving the uplink-downlink configuration as either a common TDD uplink-downlink configuration or a dedicated TDD uplink-downlink configuration. In some examples of the method, apparatuses, and non-transitory computer-readable medium described herein, the primary cell may be configured for either TDD or FDD communications.

In some examples of the method, apparatuses, and non-transitory computer-readable medium described herein, the data communications on the primary cell may be over either a physical downlink shared channel or a physical uplink shared channel. In some examples of the method, apparatuses, and non-transitory computer-readable medium described herein, the primary cell may be a DSS carrier and the secondary cell may be a non-DSS carrier. In some examples of the method, apparatuses, and non-transitory computer-readable medium described herein, the primary cell may be shared between a first RAT and a second RAT. In some examples of the method, apparatuses, and non-transitory computer-readable medium described herein, the primary cell may be a PSCell.

A method of wireless communication at a base station is described. The method may include configuring a UE to communicate with a primary cell and a secondary cell of the base station via carrier aggregation, where the secondary cell is configured for time division duplex communications in accordance with an uplink-downlink configuration. The method may also include transmitting control information to the UE during downlink transmission time intervals of the uplink-downlink configuration via the secondary cell, the control information being transmitted during UE-specific search spaces of the secondary cell and scheduling data communications on the primary cell. The method may also include transmitting the control information to the UE during uplink transmission time intervals of the uplink-downlink configuration via the primary cell, the control information being transmitted during UE-specific search spaces of the primary cell and scheduling the data communications on the primary cell.

An apparatus for wireless communication at a base station is described. The apparatus may include a processor, memory coupled with the processor, and instructions stored in the memory. The instructions may be executable by the processor to cause the apparatus to configure a UE to communicate with a primary cell and a secondary cell of the base station via carrier aggregation, where the secondary cell is configured for time division duplex communications in accordance with an uplink-downlink configuration. The instructions may cause the apparatus to transmit control information to the UE during downlink transmission time intervals of the uplink-downlink configuration via the secondary cell, the control information being transmitted during UE-specific search spaces of the secondary cell and scheduling data communications on the primary cell. The instructions may also cause the apparatus to transmit the control information to the UE during uplink transmission time intervals of the uplink-downlink configuration via the primary cell, the control information being transmitted during UE-specific search spaces of the primary cell and scheduling the data communications on the primary cell.

Another apparatus for wireless communication at a base station is described. The apparatus may include means for configuring a UE to communicate with a primary cell and a secondary cell of the base station via carrier aggregation, where the secondary cell is configured for time division duplex communications in accordance with an uplink-downlink configuration. The apparatus may include means for transmitting control information to the UE during downlink transmission time intervals of the uplink-downlink configuration via the secondary cell, the control information being transmitted during UE-specific search spaces of the secondary cell and scheduling data communications on the primary cell. The apparatus may also include means for transmitting the control information to the UE during uplink transmission time intervals of the uplink-downlink configuration via the primary cell, the control information being transmitted during UE-specific search spaces of the primary cell and scheduling the data communications on the primary cell.

A non-transitory computer-readable medium storing code for wireless communication at a base station is described. The code may include instructions executable by a processor to configure a UE to communicate with a primary cell and a secondary cell of the base station via carrier aggregation, where the secondary cell is configured for time division duplex communications in accordance with an uplink-downlink configuration. The code may include instructions executable by a processor to transmit control information to the UE during downlink transmission time intervals of the uplink-downlink configuration via the secondary cell, the control information being transmitted during UE-specific search spaces of the secondary cell and scheduling data communications on the primary cell. The code may also include instructions executable by a processor to transmit the control information to the UE during uplink transmission time intervals of the uplink-downlink configuration via the primary cell, the control information being transmitted during UE-specific search spaces of the primary cell and scheduling the data communications on the primary cell.

In some examples of the method, apparatuses, and non-transitory computer-readable medium described herein, transmitting the control information to the UE during the uplink transmission time intervals may include operations, features, means, or instructions for transmitting the control information to the UE via only the primary cell during the uplink transmission time intervals of the uplink-downlink configuration.

In some examples of the method, apparatuses, and non-transitory computer-readable medium described herein, transmitting the control information to the UE during the downlink transmission time intervals may include operations, features, means, or instructions for transmitting the control information to the UE via both the primary cell and the secondary cell during the downlink transmission time intervals of the uplink-downlink configuration.

In some examples of the method, apparatuses, and non-transitory computer-readable medium described herein, transmitting the control information to the UE during the downlink transmission time intervals may include operations, features, means, or instructions for transmitting the control information to the UE via at least the secondary cell during non-uplink transmission time intervals of the uplink-downlink configuration.

Some examples of the method, apparatuses, and non-transitory computer-readable medium described herein may further include operations, features, means, or instructions for transmitting the uplink-downlink configuration as either a common TDD uplink-downlink configuration or a dedicated TDD uplink-downlink configuration.

In some examples of the method, apparatuses, and non-transitory computer-readable medium described herein, transmitting the control information to the UE during the uplink transmission time intervals may include operations, features, means, or instructions for transmitting the control information during the UE-specific search spaces of the primary cell in accordance with a PDCCH monitoring occasion of the secondary cell.

In some examples of the method, apparatuses, and non-transitory computer-readable medium described herein, transmitting the control information to the UE during the downlink transmission time intervals may include operations, features, means, or instructions for transmitting the control information during the UE-specific search spaces of the secondary cell in accordance with a PDCCH monitoring occasion of the primary cell.

In some examples of the method, apparatuses, and non-transitory computer-readable medium described herein, transmitting the control information to the UE during the uplink transmission time intervals may include operations, features, means, or instructions for transmitting the control information during the UE-specific search spaces of the primary cell in accordance with a PDCCH monitoring occasion of the primary cell.

In some examples of the method, apparatuses, and non-transitory computer-readable medium described herein, transmitting the control information to the UE during the downlink transmission time intervals may include operations, features, means, or instructions for transmitting the control information during the UE-specific search spaces of the secondary cell in accordance with a PDCCH monitoring occasion of the secondary cell. In some examples of the method, apparatuses, and non-transitory computer-readable medium described herein, the primary cell may be configured for either TDD or FDD communications.

In some examples of the method, apparatuses, and non-transitory computer-readable medium described herein, the data communications on the primary cell may be over either a physical downlink shared channel or a physical uplink shared channel. In some examples of the method, apparatuses, and non-transitory computer-readable medium described herein, the primary cell may be a DSS carrier and the secondary cell may be a non-DSS carrier. In some examples of the method, apparatuses, and non-transitory computer-readable medium described herein, the primary cell may be shared between a first RAT and a second RAT. In some examples of the method, apparatuses, and non-transitory computer-readable medium described herein, the primary cell may be a PSCell.

A method for wireless communication at a UE is described. The method may include identifying that the UE is in carrier aggregation communication with a primary cell and a secondary cell, monitoring, during one or more time intervals, UE-specific search spaces of the secondary cell for control information scheduling data communications on the primary cell, and switching, during one or more different time intervals, from monitoring the UE-specific search spaces of the secondary cell to monitoring UE-specific search spaces of the primary cell for the control information scheduling the data communications on the primary cell.

An apparatus for wireless communication at a UE is described. The apparatus may include a processor, memory coupled with the processor, and instructions stored in the memory. The instructions may be executable by the processor to cause the apparatus to identify that the UE is in carrier aggregation communication with a primary cell and a secondary cell, monitor, during one or more time intervals, UE-specific search spaces of the secondary cell for control information scheduling data communications on the primary cell, and switching, during one or more different time intervals, from monitor the UE-specific search spaces of the secondary cell to monitoring UE-specific search spaces of the primary cell for the control information scheduling the data communications on the primary cell.

Another apparatus for wireless communication at a UE is described. The apparatus may include means for identifying that the UE is in carrier aggregation communication with a primary cell and a secondary cell, means for monitoring, during one or more time intervals, UE-specific search spaces of the secondary cell for control information scheduling data communications on the primary cell, and means for switching, during one or more different time intervals, from monitoring the UE-specific search spaces of the secondary cell to monitoring UE-specific search spaces of the primary cell for the control information scheduling the data communications on the primary cell.

A non-transitory computer-readable medium storing code for wireless communication at a UE is described. The code may include instructions executable by a processor to identify that the UE is in carrier aggregation communication with a primary cell and a secondary cell, monitor, during one or more time intervals, UE-specific search spaces of the secondary cell for control information scheduling data communications on the primary cell, and switching, during one or more different time intervals, from monitor the UE-specific search spaces of the secondary cell to monitoring UE-specific search spaces of the primary cell for the control information scheduling the data communications on the primary cell.

In some examples of the method, apparatuses, and non-transitory computer-readable medium described herein, the control information may be available to be monitored by the UE via only the primary cell during the one or more different time intervals.

Some examples of the method, apparatuses, and non-transitory computer-readable medium described herein may further include operations, features, means, or instructions for monitoring the UE-specific search spaces of the primary cell for the control information in accordance with a PDCCH monitoring occasion of the secondary cell.

In some examples of the method, apparatuses, and non-transitory computer-readable medium described herein, monitoring the UE-specific search spaces of the secondary cell may include operations, features, means, or instructions for monitoring the UE-specific search spaces of the secondary cell in accordance with a PDCCH monitoring occasion of the primary cell.

Some examples of the method, apparatuses, and non-transitory computer-readable medium described herein may further include operations, features, means, or instructions for monitoring the UE-specific search spaces of the primary cell for the control information in accordance with a PDCCH monitoring occasion of the primary cell.

In some examples of the method, apparatuses, and non-transitory computer-readable medium described herein, monitoring the UE-specific search spaces of the secondary cell may include operations, features, means, or instructions for monitoring the UE-specific search spaces of the secondary cell in accordance with a PDCCH monitoring occasion of the secondary cell.

In some examples of the method, apparatuses, and non-transitory computer-readable medium described herein, the control information may be available to be monitored by the UE via both the primary cell and the secondary cell during the one or more time intervals.

In some examples of the method, apparatuses, and non-transitory computer-readable medium described herein, the control information may be available to be monitored by the UE via at least the secondary cell during non-uplink time intervals.

In some examples of the method, apparatuses, and non-transitory computer-readable medium described herein, the data communications on the primary cell may be over either a physical downlink shared channel or a physical uplink shared channel.

In some examples of the method, apparatuses, and non-transitory computer-readable medium described herein, the secondary cell may be configured for time division duplex communications in accordance with an uplink-downlink configuration.

In some examples of the method, apparatuses, and non-transitory computer-readable medium described herein, the one or more time intervals may be downlink transmission time intervals of the uplink-downlink configuration, and and the one or more different time intervals may be uplink transmission time intervals of the uplink-downlink configuration.

Some examples of the method, apparatuses, and non-transitory computer-readable medium described herein may further include operations, features, means, or instructions for receiving the uplink-downlink configuration as either a common TDD uplink-downlink configuration or a dedicated TDD uplink-downlink configuration.

In some examples of the method, apparatuses, and non-transitory computer-readable medium described herein, the primary cell may be configured for either TDD or FDD communications.

In some examples of the method, apparatuses, and non-transitory computer-readable medium described herein, the primary cell may be a DSS carrier and the secondary cell may be a non-DSS carrier.

In some examples of the method, apparatuses, and non-transitory computer-readable medium described herein, the primary cell may be shared between a first RAT and a second RAT.

In some examples of the method, apparatuses, and non-transitory computer-readable medium described herein, the primary cell may be a PSCell.

DETAILED DESCRIPTION

In dynamic spectrum sharing, a component carrier in carrier aggregation may be configured to share resources between multiple Radio Access Technologies (RATs), such as NR and LTE. Cross-carrier scheduling may also be enabled, where one carrier contains scheduling data for another carrier. A carrier such as a secondary cell may monitor for control information for a primary cell in the UE-specific search space of the SCell. The SCell may contain the control information when it is operating in a downlink symbol, but it may not be possible to contain control information when it is operating in an uplink symbol. Techniques described herein use the PCell to contain the control information that would have been on the SCell during the uplink symbol, if it were not for the SCell being at an uplink symbol.

A monitoring UE may monitor the secondary cell during downlink symbols and switch symbols but may not monitor the secondary cell during uplink symbols. Instead, the UE may switch and monitor the primary cell during the uplink symbols. A base station may transmit the scheduling DCI on the primary cell during the uplink symbols but could also transmit the scheduling DCI on both the secondary cell and the primary cell during non-uplink symbols. The frequency of transmission may be dictated by the PDCCH monitoring occasions (e.g., based at least in part on sub-carrier spacing) of either the primary cell or the secondary cell. The frequency of the DCI transmission on the primary cell may be based on the PDCCH monitoring occasions of the primary cell. Alternatively, the frequency of the DCI transmission on the primary cell may be based on the PDCCH monitoring occasions of the secondary cell.

Aspects of the disclosure are initially described in the context of wireless communications systems. Aspects of the disclosure are further described in the context of a diagrams illustrating process flows and frames for component carriers. Aspects of the disclosure are further illustrated by and described with reference to apparatus diagrams, system diagrams, and flowcharts that relate to providing cross-carrier scheduling control information for a primary cell via both a secondary cell and the primary cell.

Figure 1:
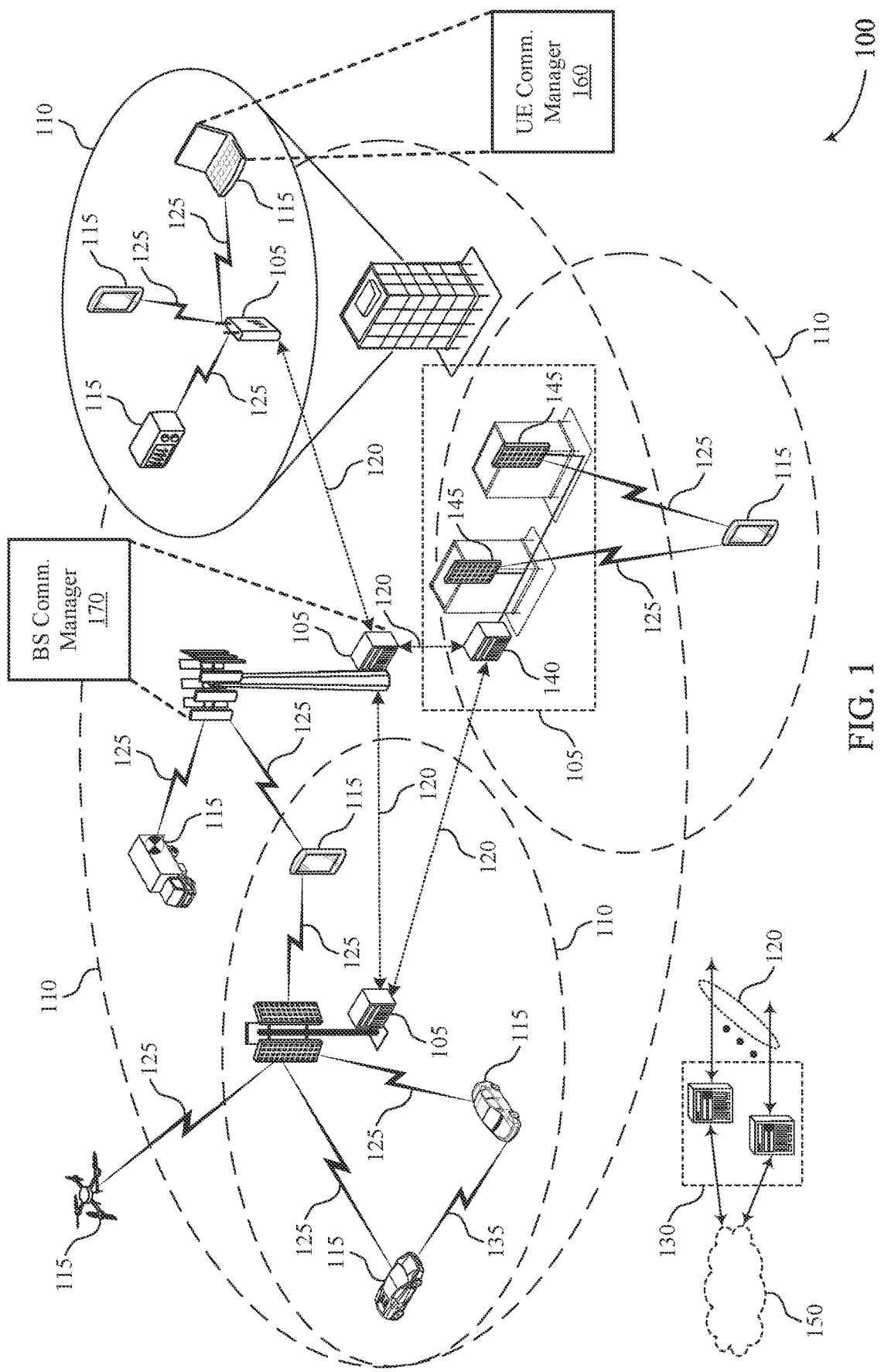
FIG. 1 illustrates an example of a system for wireless communications that supports providing cross-carrier scheduling control information for a primary cell via both a secondary cell and the primary cell in accordance with aspects of the present disclosure.

FIG. 1 illustrates an example of a wireless communications system 100 that supports providing cross-carrier scheduling control information for a primary cell via both a secondary cell and the primary cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may include a UE communications manager 160. The UE communications manager 160 may identify that the UE 115 is in carrier aggregation communication with a primary cell and a secondary cell. The secondary cell may be configured for TDD communications in accordance with an uplink-downlink configuration. The UE communications manager 160 may monitor, during downlink transmission time intervals of the uplink-downlink configuration, UE-specific search spaces of the secondary cell for control information scheduling data communications on the primary cell. The UE communications manager 160 may switch, during uplink transmission time intervals of the uplink-downlink configuration, from monitoring the UE-specific search spaces of the secondary cell to monitoring UE-specific search spaces of the primary cell for the control information scheduling the data communications on the primary cell.

A base station (BS) 105 may include a base station communications manager 170. The base station communications manager 170 may configure a UE 115 to communicate with a primary cell and a secondary cell of the base station 105 via carrier aggregation. The secondary cell may be configured for time division duplex communications in accordance with an uplink-downlink configuration. The base station communications manager 170 may transmit control information to the UE during downlink transmission time intervals of the uplink-downlink configuration via the secondary cell, the control information being transmitted during UE-specific search spaces of the secondary cell and scheduling data communications on the primary cell. The base station communications manager 170 transmitting the control information to the UE during uplink transmission time intervals of the uplink-downlink configuration via the primary cell, the control information being transmitted during UE-specific search spaces of the primary cell and scheduling the data communications on the primary cell.

The UE communications manager 160 may reduce latency, improve throughput, improve reliability of communications, reduce retransmissions, and improve power savings at the UE. Likewise, the base station communications manager 170 may reduce latency, improve throughput, improve reliability of communications, and reduce retransmissions.

Figure 2:
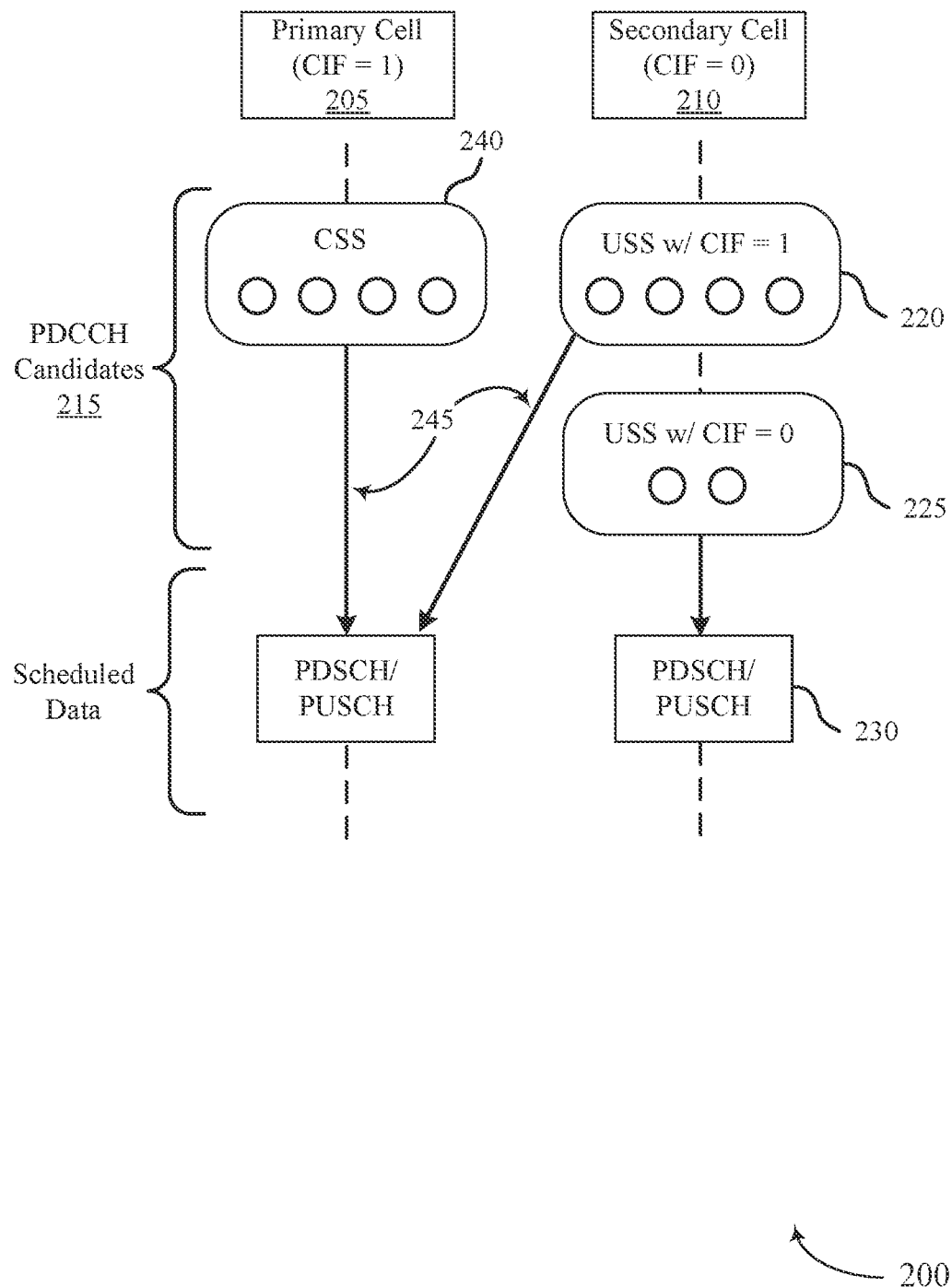
FIG. 2 illustrates an example of a diagram of carrier components that supports providing cross-carrier scheduling control information for a primary cell via both a secondary cell and the primary cell in accordance with aspects of the present disclosure.

FIG. 2 illustrates an example of a diagram 200 of carrier components that supports providing cross-carrier scheduling control information for a primary cell via both a secondary cell and the primary cell in accordance with aspects of the present disclosure. In some examples, the diagram 200 may implement aspects of wireless communications system 100.

The diagram 200 includes a primary cell 205 and a secondary cell 210, that may be used for carrier aggregation communications between a UE and a base station. The primary cell 205 may be a PCell or a PSCell. The secondary cell 210 may be an SCell. The secondary cell 210 may be configured for TDD communications in accordance with an uplink-downlink configuration. Examples of the uplink-downlink configuration may be seen in FIGS. 3 and 5-7.

The primary cell 205 and a secondary cell 210 may be used for DSS. In some examples, the primary cell 205 may be configured as a DSS carrier and the secondary cell 210 may not be configured as a DSS carrier. Thus, the primary cell 205 may be shared between two different RATs, such as LTE and NR. Because resources may be limited on the primary cell 205 due to sharing resources between two different RATs, some control signaling for the primary cell 205 may be located on the secondary cell 210. From the point of view of a UE, there are two carriers, which include a carrier for control signals and a data channel. However, some of the techniques described herein move the control channel from the DSS carrier (i.e., primary cell 205) to the non-DSS carrier (i.e., secondary cell 210). This may enable the overhead of the DSS carrier to be used for other information.

The diagram 200 illustrates cross-carrier scheduling from one cell to another cell, namely from the secondary cell 210 to the primary cell 205. In self-scheduling, scheduling grants or scheduling assignments may be transmitted on the same cell (that is, the same cell that is associated with the scheduling). In cross-carrier scheduling, scheduling grants or scheduling assignments may be transmitted on a different cell than the cell associated with the scheduling grants and assignments. Cross-carrier scheduling may be performed on a cell that also performs self-scheduling.

When cross-carrier scheduling is configured from the secondary cell 210 to the primary cell 205, self-scheduling on the primary cell 205 may be allowed. This means multiple scheduling is enabled for the primary cell 205 (i.e., scheduling control information in two different carriers). In some examples, cross-carrier scheduling from the primary cell 205 to the secondary cell 210 may not be allowed. However, self-scheduling on the secondary cell 210 used for scheduling the primary cell 205 may be allowed.

In some examples, the secondary cell 210 may be used for scheduling of another cell. However, another cell may not be able to have cross-carrier scheduling with the secondary cell 210 (e.g., another cell may not contain PDCCH candidates for scheduling information for the secondary cell).

The primary cell 205 may have a common search space 240. The common search space 240 may be used for self-scheduling or may contain data or other information. The PDCCH candidates 215 in the USS 220 may be used for control information scheduling data communications on the primary cell. That is, PDCCH candidates 245 may be used for control information scheduling data communications on the primary cell.

The secondary cell 210 may include PDCCH candidates 215 in a UE-specific search space (USS) 220. In some examples, the USS 220 may have a carrier indicator field (CIF) set to a value of 1. In this example, the USS 220 may be used for cross-carrier scheduling for the primary cell 205. The secondary cell 210 may also include a USS 225 that may have a CIF set to a value of 0. The USS 225 may be used for self-scheduling at the secondary cell 210, which may be monitored for in PDSCH or PUSCH monitoring occasions 230.

In the example of FIG. 2, the UE has four PDCCH candidates for the CSS 240 on the primary cell 205. The UE may also have four candidates on the USS 220 on the secondary cell 210. Those eight PDCCH candidates 245 may be used for data scheduling on the primary cell 205. The UE may also include two candidates on the secondary cell 210 that can be used for data scheduling on the secondary cell 210.

Cross-carrier scheduling may be performed despite differences in PDCCH monitoring occasions such as sub-carrier spacing differences. For example, the secondary cell 210 may operate at 30 kiloHertz (kHz) while the primary cell 205 may operate at 15 kHz. Monitoring the UE-specific search spaces of the secondary cell 210 and the primary cell 205 may be in accordance with a PDCCH monitoring occasion of the secondary cell 210 or the primary cell 205.

Figure 3:
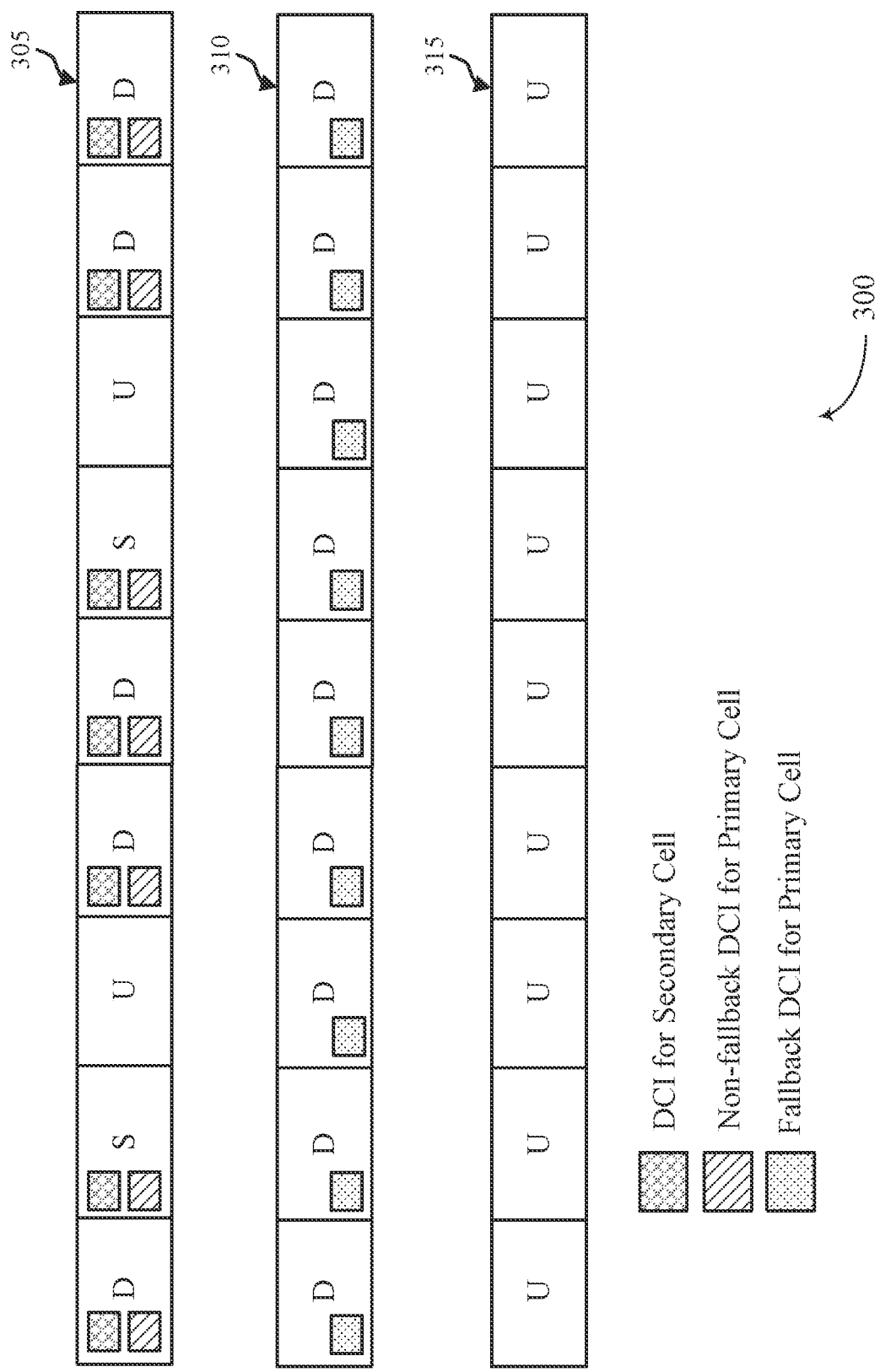
FIG. 3 illustrates an example of a diagram that supports providing cross-carrier scheduling control information for a primary cell via both a secondary cell and the primary cell in accordance with aspects of the present disclosure.

FIG. 3 illustrates an example of a diagram 300 that supports providing cross-carrier scheduling control information for a primary cell via both a secondary cell and the primary cell in accordance with aspects of the present disclosure. In some examples, the diagram 300 may be implemented in aspects of wireless communications system 100. The diagram 300 illustrates configurations for frames 305, 310, and 315, for two or more component carriers.

The frames 305, 310, and 315 may show a series of time slots or symbols having different configurations. For example, the frame 305 may include downlink symbols denoted by D, switching symbols denoted by S, and uplink symbols denoted by U. A UE may receive downlink information on the secondary cell during a D symbol, switch between downlink to uplink during an S symbol, and uplink information during a U symbol.

The frames 305 may correspond to a secondary cell (e.g., SCell) that is configured for TDD communications in accordance with an uplink-downlink configuration. For example, the frames 305 may follow a TDD pattern. The frames 310 and 315 may correspond to one or more primary cells, such as FDD communications over a PCell. The frames 305 and 310 may include control information (such as, for example, DCI) during the downlink symbols. In the frame 305, the secondary cell may include DCI for the secondary cell as well as non-fallback DCI for the primary cell. The frame 310 on the primary cell may include fallback DCI for the primary cell.

While cross-carrier scheduling may free up resources on the primary cell, having two carriers containing scheduling information for the primary cells adds complications because the UE has to monitor many PDCCH or search space candidates to prepare for data scheduling on the primary cell. The UE is configured with monitoring for PDCCH (e.g., fallback DCI) once per slot. However, when the TDD carrier is an UL slot, it is not possible to put the PDCCH on the UL slot. Therefore, the UE is unable to monitor for the PDCCH on the UL slot. This means the data scheduling on the primary cell from the secondary cell would not be available at that moment.

In some examples, the UE does not monitor PDCCH on the secondary cell in a PDCCH monitoring occasion that overlaps with UL symbols that are semi-statically configured by tdd-UL-DL-ConfigCommon and/or tdd-UL-DL-ConfigDedicated. However, techniques described herein may fix the cell where non-fallback DCI that schedules data on the primary cell (or the primary second cell) when the secondary cell is in uplink. The techniques may fix the cell where the non-fallback DCI that schedules data on the primary cell is located. This could be, for example, on the secondary cell when the secondary cell is in downlink and on the primary cell when the secondary cell is in uplink.

As described herein, the UE may switch, during uplink transmission time intervals of the uplink-downlink configuration shown in frame 305, from monitoring the UE-specific search spaces of the secondary cell to monitoring UE-specific search spaces of the primary cell for the control information scheduling the data communications on the primary cell. For example, when the secondary cell of the UE is in uplink, the UE may monitor the PDCCH candidates of the primary cell for the control information scheduling the data communications on the primary cell that would otherwise be on the secondary cell.

Figure 4:
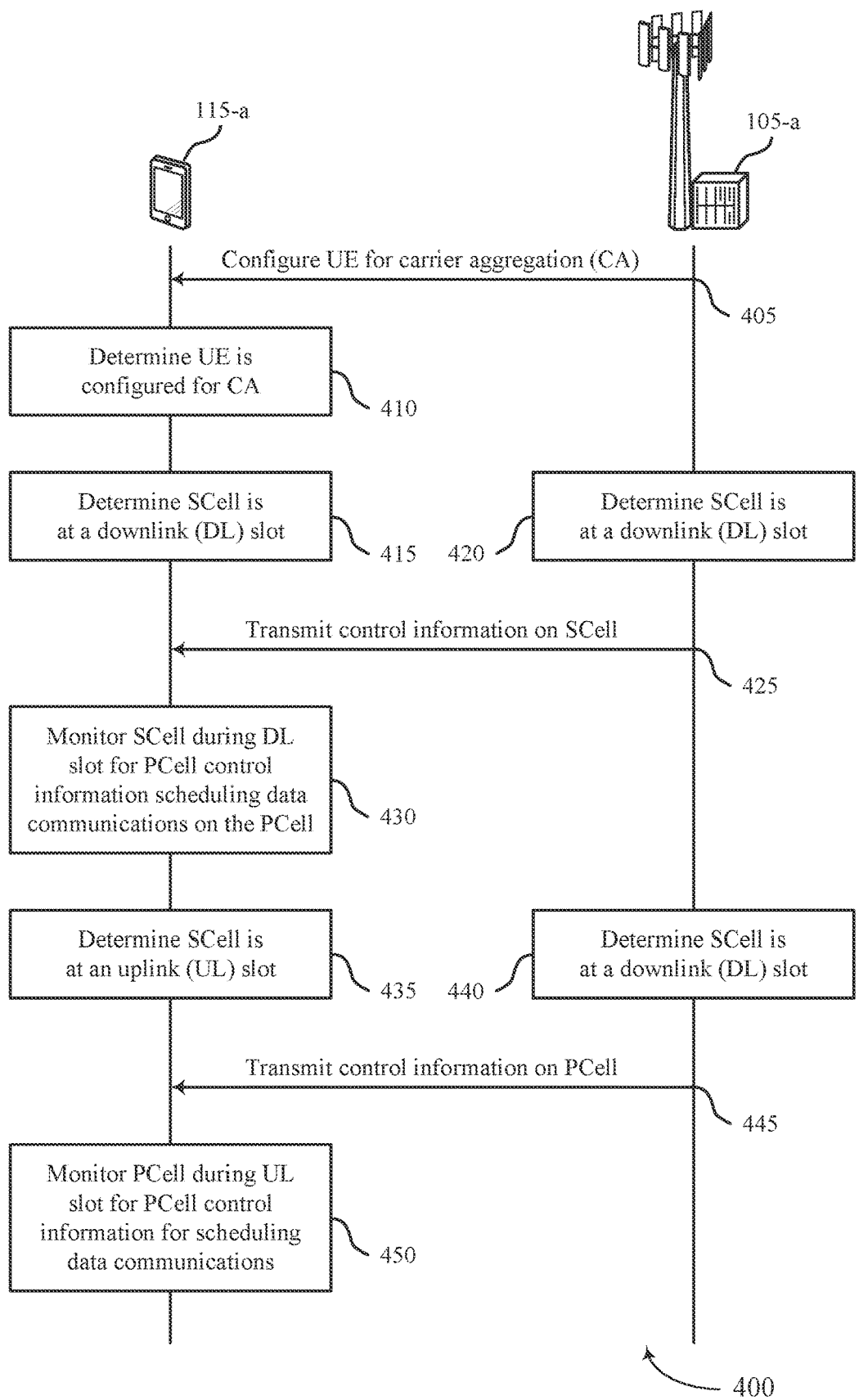
FIG. 4 illustrates an example of a process flow that supports providing cross-carrier scheduling control information for a primary cell via both a secondary cell and the primary cell in accordance with aspects of the present disclosure.

FIG. 4 illustrates an example of a process flow 400 that supports providing cross-carrier scheduling control information for a primary cell via both a secondary cell and the primary cell in accordance with aspects of the present disclosure. In some examples, the process flow 400 may be implemented in aspects of wireless communications system 100. The process flow 400 includes a UE 115-a, which may be an example a UE 115 as described herein with reference to FIG. 1. Similarly, the process flow 400 includes a base station 105-a, which may be an example a base station 105 as described herein with reference to FIG. 1.

At 405, the base station 105-a may configure the UE 115-a for carrier aggregation. For example, the UE 115-a may be configured for communications over a primary cell and a secondary cell. At 410, the UE 115-a may determine that it is configured for carrier aggregation with the PCell/PSCell and the SCell, which may be based on the configuration.

In some examples, the primary cell may be a PCell or a PSCell and the secondary cell may be an SCell, but will be referred to as a PCell for the purposes of FIG. 4. The SCell may be configured for TDD multiplexing. The PCell/PSCell may be configured for either TDD or FDD communications. In some examples, the primary cell is a DSS carrier and the secondary cell is a non-DSS carrier. The PCell/PSCell may be operable to share resources between two RATs, such as NR and LTE. Data communications on the primary cell are over either a physical downlink shared channel or a physical uplink shared channel.

At 415, the UE 115-a may determine that the SCell is at a downlink or a switching slot of an uplink-downlink configuration of the TDD communications. Likewise, at 420, the base station 105-a may determine that the UE 115-a is at a downlink or a switching slot. The base station 105-a may transmit control information for the PCell on the SCell at 425. At 430, when the UE 115-a is in a DL or S symbol, the UE 115-a may monitor the SCell for PCell control information scheduling data communications on the PCell.

At 435, the UE 115-a may determine that the SCell is at an uplink slot of the uplink-downlink configuration of the TDD communications. Likewise, at 440, the base station 105-a may also determine that the SCell is at the uplink slot. Therefore, the base station 105-a will not transmit the control information for the PCell on the SCell during the uplink slot. Instead, the base station 105-a may transmit control information for the PCell on the PCell at 445. At 450, when the UE 115-a is in an UL symbol on the SCell, the UE 115-a may monitor the PCell for the control information scheduling data communications on the PCell.

Figure 5:
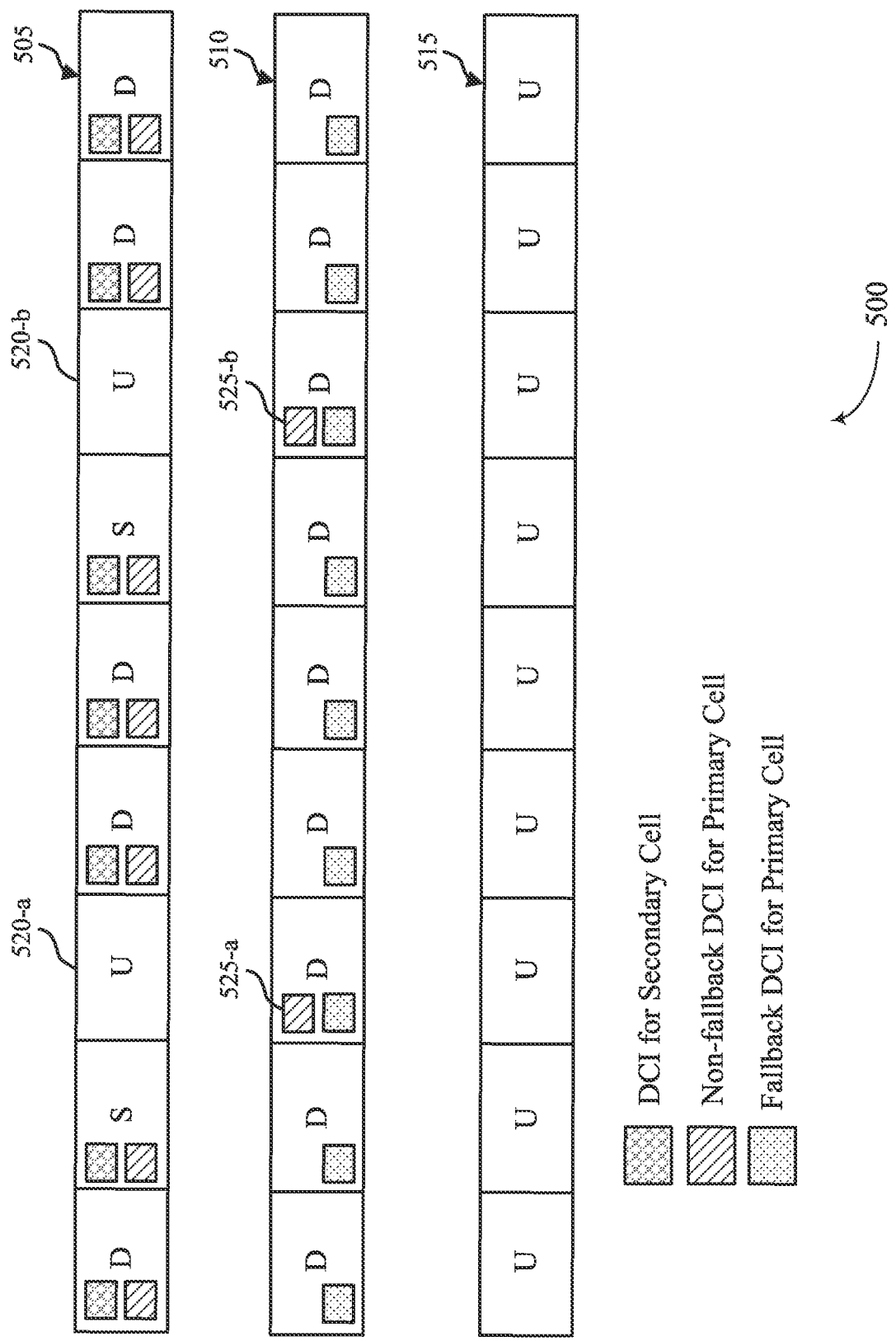
FIGS. 5-7 illustrate examples of a diagram that supports providing cross-carrier scheduling control information for a primary cell via both a secondary cell and the primary cell in accordance with aspects of the present disclosure.

FIG. 5 illustrates an example of a diagram 500 that supports providing cross-carrier scheduling control information for a primary cell via both a secondary cell and the primary cell in accordance with aspects of the present disclosure. In some examples, the diagram 500 may be implemented in aspects of wireless communications system 100. The diagram 500 illustrates configurations for frames 505, 510, and 515, for two or more component carriers.

The frames 505, 510, and 515 may show a series of time slots or symbols having different configurations. For example, the frame 505 may include downlink symbols denoted by D, switching symbols denoted by S, and uplink symbols denoted by U. A UE may receive downlink information on the secondary cell during a D symbol, switch between downlink to uplink during an S symbol, and uplink information during a U symbol.

The frames 505 may correspond to a secondary cell (e.g., SCell) that is configured for TDD communications in accordance with an uplink-downlink configuration. For example, the frames 505 may follow a TDD pattern, DSUDDSUDD. The frames 510 and 515 may correspond to one or more primary cells, such as FDD communications over a single PCell. The frames 505 and 510 may include control information (such as, for example, DCI) during the downlink symbols. In the frame 505, the secondary cell may include DCI for the secondary cell as well as non-fallback DCI for the primary cell only during D and S symbols.

The frame 510 on the primary cell may include fallback DCI for the primary cell. The frame 510 may also include DCI 525-a and 525-b when the secondary cell is in an UL symbol, such as UL symbols 520-a and 520-b. That is, the cross-carrier scheduling of the control information 525 on the secondary cell is moved to the primary cell when the secondary cell is in UL. As described herein, the UE may switch, during uplink transmission time intervals of the uplink-downlink configuration shown in frame 505, from monitoring the UE-specific search spaces of the secondary cell to monitoring UE-specific search spaces of the primary cell for the control information scheduling the data communications on the primary cell. For example, when the secondary cell of the UE is in uplink, the UE may monitor the PDCCH candidates of the primary cell for the control information scheduling the data communications on the primary cell that would otherwise be on the secondary cell.

In some examples, the control information is available to be monitored by the UE via only the primary cell during the uplink transmission time intervals of the uplink-downlink configuration. Otherwise, the control information is on the secondary cell. In some examples, the control information is available to be monitored by the UE via both the primary cell and the secondary cell during the downlink transmission time intervals of the uplink-downlink configuration.

Techniques described herein configure the non-fallback DCI for the PCell/PSCell to be on the PCell when it is not monitored on the SCell. Based on this semi-static TDD configuration, the UE knows which slots when it does not need to monitor the PDCCH on the uplink of the SCell. There is control information available on the PCell but only when the PDCCH is not monitored on the SCell.

In some examples, the network or base station can configure the non-fallback DCI or UE SS on PCell/PSCell when it is not monitored on the SCell in a monitoring span or a slot due to higher-layer configuration (e.g., tdd-UL-DL-Config-Common and/or tdd-UL-DL-ConfigDedicated). The network may have the responsibility to avoid interfering with the DCI on the DL slot.

Alternatively, some examples, the network or base station can configure the non-fallback DCI on PCell/PSCell, as well as on the SCell, without restricting it to only being present on the PCell during the UL slots. The UE may monitor for the non-fallback DCI on PCell/PSCell only when it is not monitored on the SCell in a monitoring span or a time slot due to higher-layer configuration (e.g., tdd-UL-DL-Config-Common and/or tdd-UL-DL-ConfigDedicated). Otherwise, the UE monitors it on the SCell.

Figure 6:
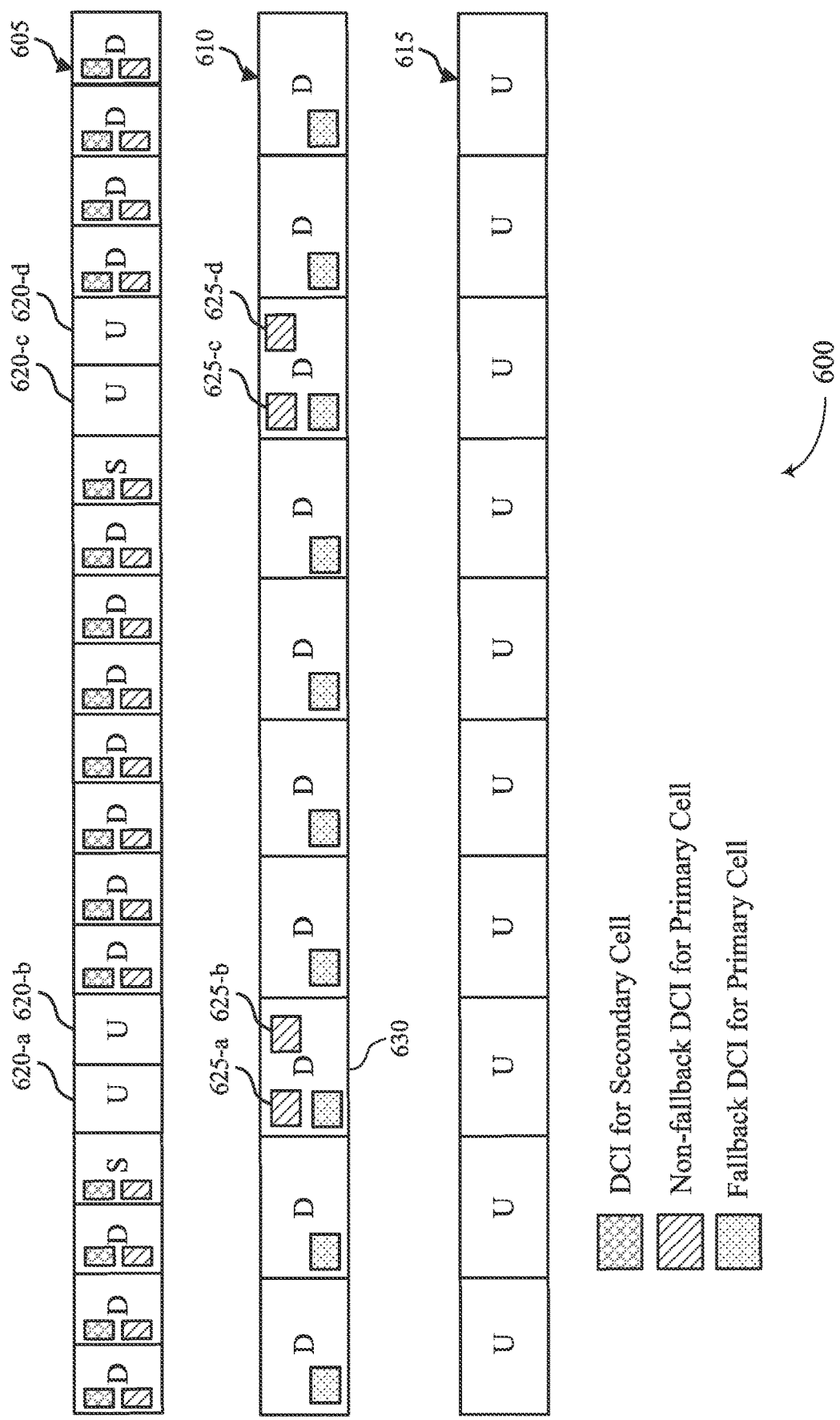

FIG. 6 illustrates an example of a diagram 600 that supports providing cross-carrier scheduling control information for a primary cell via both a secondary cell and the primary cell in accordance with aspects of the present disclosure. In some examples, the diagram 600 may be implemented in aspects of wireless communications system 100. The diagram 600 illustrates configurations for frames 605, 610, and 615, for two or more component carriers, similar to that shown in FIGS. 3 and 5.

In the example of FIG. 6, the primary cell and secondary cell have different PDCCH monitoring occasions. For example, the primary cell operates at 15 kHz and the secondary cell operates at 30 kHz. In this example, the base station may provide two instances of DCI information 625 in a single downlink symbol of the frame 610 for the PCell. For example, the downlink frame 630 contains two DCI instances 625-a and 625-b during the UL symbols 620. The UE may monitor the UE-specific search spaces of the primary cell for the control information in accordance with a PDCCH monitoring occasion of the secondary cell. For example, the UE monitors the PCell according to the subcarrier spacing of the SCell.

Figure 7:
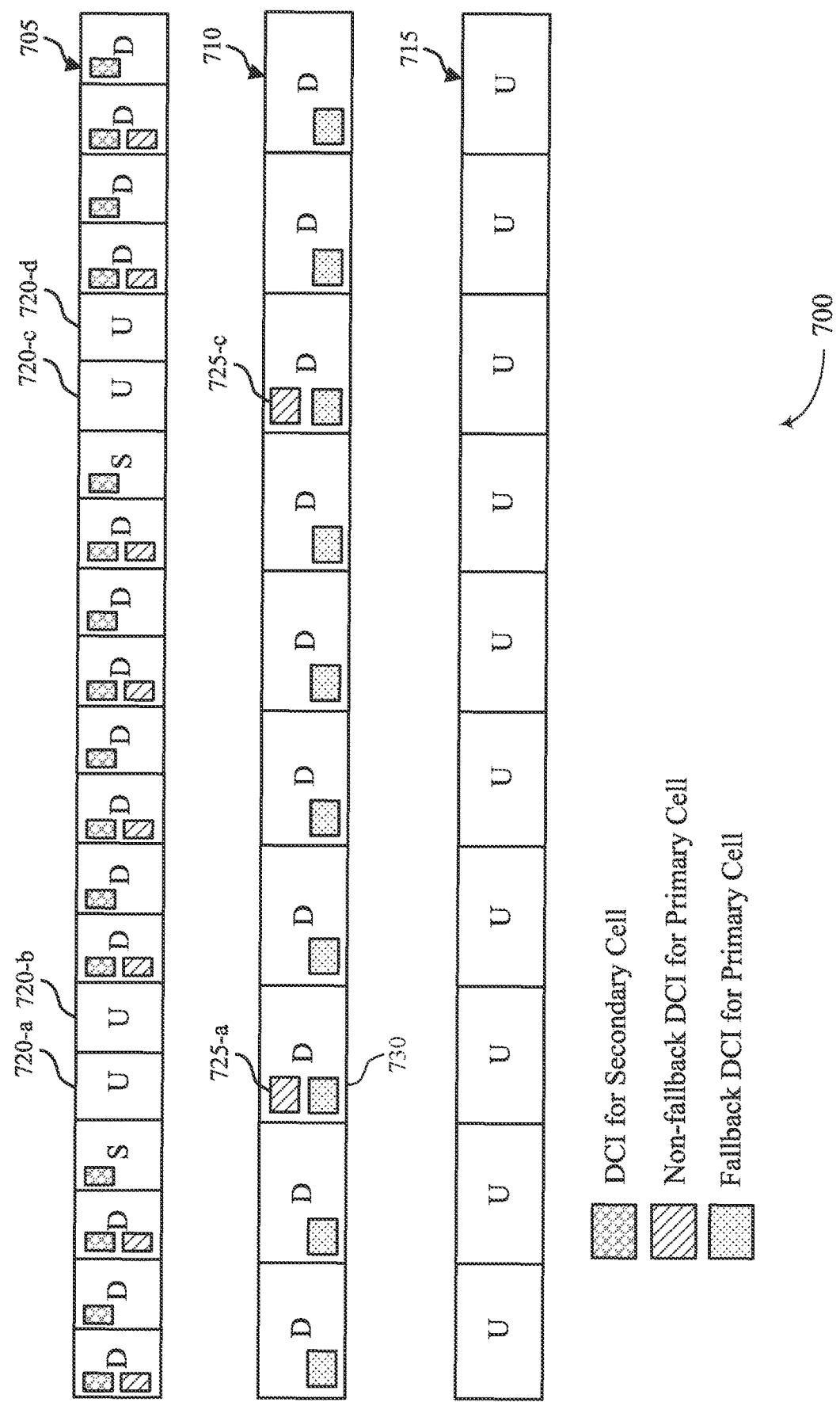

FIG. 7 illustrates an example of a diagram 700 that supports providing cross-carrier scheduling control information for a primary cell via both a secondary cell and the primary cell in accordance with aspects of the present disclosure. In some examples, the diagram 700 may be implemented in aspects of wireless communications system 100. The diagram 700 illustrates configurations for frames 705, 710, and 715, for two or more component carriers, similar to that shown in FIGS. 3, 5, and 6.

In the example of FIG. 7, the primary cell and secondary cell have different PDCCH monitoring occasions. For example, the primary cell operates at 15 kHz and the secondary cell operates at 30 kHz. In this example, the base station may provide only a single instance of DCI information 725 in a downlink symbol of the frame 710 for the PCell. This means that, correspondingly, the DCI information 725 for the PCell will also only be provided in every other downlink symbol of the frame 705 for the SCell. For example, the downlink frame 730 contains just one DCI instance 725-a during the UL symbols 720-a and 720-b. The UE may monitor the UE-specific search spaces of the primary cell for the control information in accordance with a PDCCH monitoring occasion of the primary cell. For example, the UE monitors the PCell according to the subcarrier spacing of the PCell when the SCell is in UL.

Figure 8:
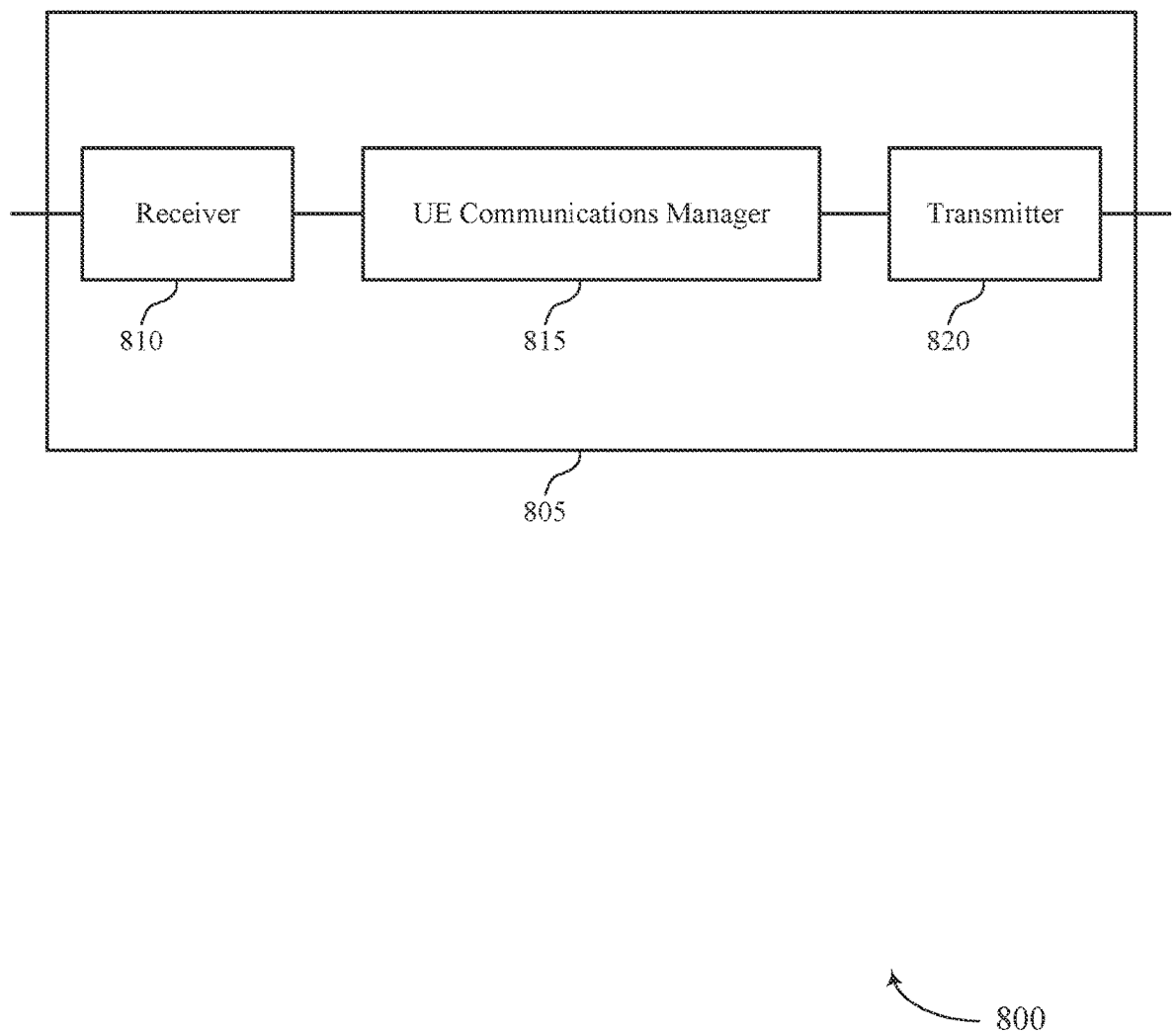
FIGS. 8 and 9 show diagrams of devices that support providing cross-carrier scheduling control information for a primary cell via both a secondary cell and the primary cell in accordance with aspects of the present disclosure.

FIG. 8 shows a diagram 800 of a device 805 that supports providing cross-carrier scheduling control information for a primary cell via both a secondary cell and the primary cell in accordance with aspects of the present disclosure. The device 805 may be an example of aspects of a UE 115 or base station 105 as described herein. The device 805 may include a receiver 810, a UE communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to providing cross-carrier scheduling control information for a primary cell via both a secondary cell and the primary cell, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The UE communications manager 815 may be an example of one or more aspects of the UE communications manager 160 of FIG. 1. The UE communications manager 815 may identify that the UE is in carrier aggregation communication with a primary cell and a secondary cell, where the secondary cell is configured for TDD communications in accordance with an uplink-downlink configuration. The UE communications manager 815 may monitor, during downlink transmission time intervals of the uplink-downlink configuration, UE-specific search spaces of the secondary cell for control information scheduling data communications on the primary cell. The UE communications manager 815 may switch, during uplink transmission time intervals of the uplink-downlink configuration, from monitoring the UE-specific search spaces of the secondary cell to monitoring UE-specific search spaces of the primary cell for the control information scheduling the data communications on the primary cell.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
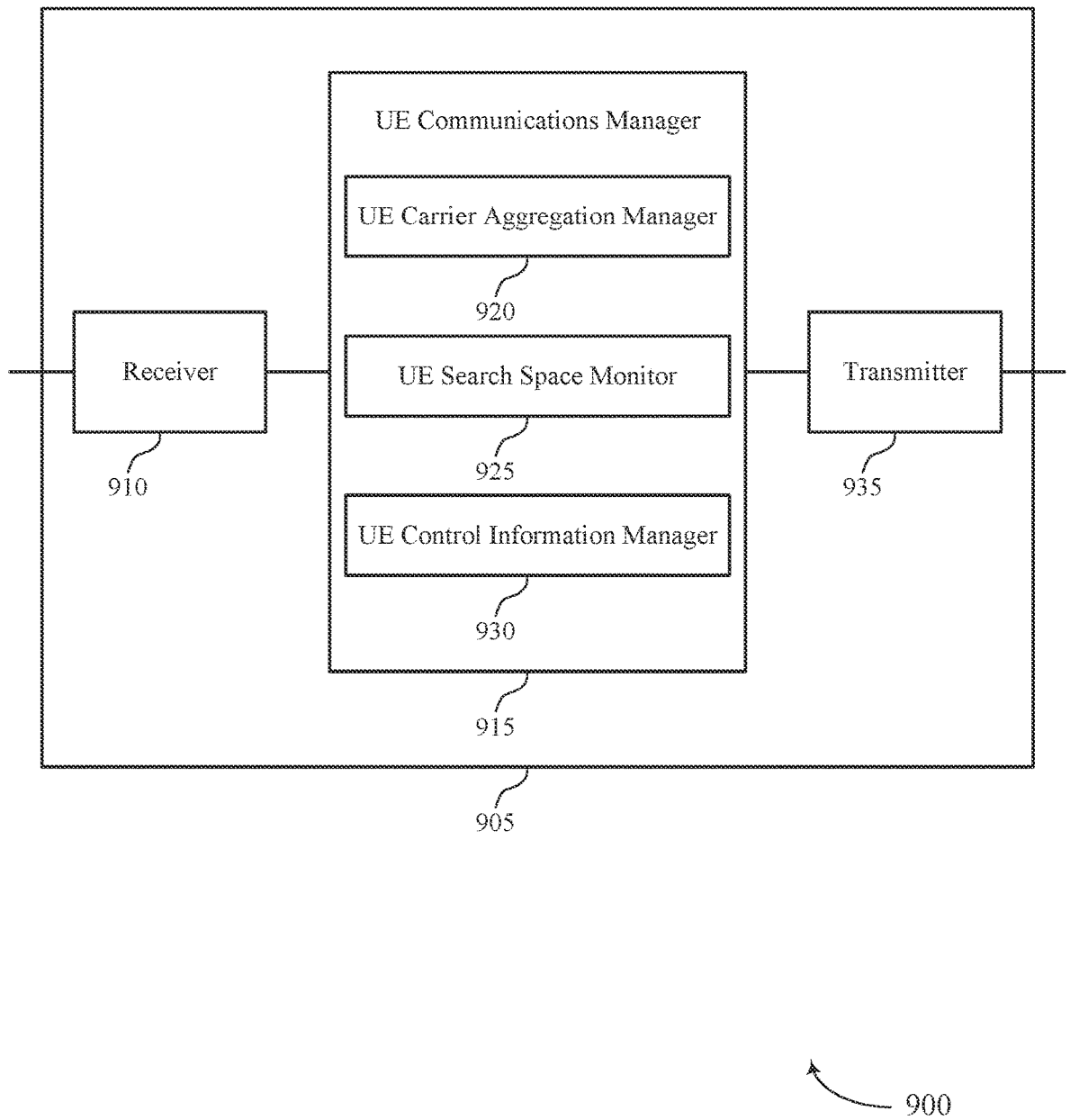

FIG. 9 shows a diagram 900 of a device 905 that supports providing cross-carrier scheduling control information for a primary cell via both a secondary cell and the primary cell in accordance with aspects of the present disclosure. The device 905 may be an example of aspects of a device 805, a UE 115, or a base station 105 as described herein. The device 905 may include a receiver 910, a UE communications manager 915, and a transmitter 935. The device 905 may also include a processor. Each of these components may be in communication with one another (e.g., via one or more buses).

Receiver 910 may receive information such as packets, user data, or control information associated with various information channels (e.g., control channels, data channels, and information related to providing cross-carrier scheduling control information for a primary cell via both a secondary cell and the primary cell, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The UE communications manager 915 may be an example of aspects of the UE communications manager 815 or 160 as described herein. The UE communications manager 915 may include a UE carrier aggregation manager 920, a UE search space monitor 925, and a UE control information manager 930. The UE communications manager 915 may be an example of aspects of the UE communications manager 1110 or 1210 as described herein.

The UE carrier aggregation manager 920 may identify that the UE is in carrier aggregation communication with a primary cell and a secondary cell, where the secondary cell is configured for TDD communications in accordance with an uplink-downlink configuration.

The UE search space monitor 925 may monitor, during downlink transmission time intervals of the uplink-downlink configuration, UE-specific search spaces of the secondary cell for control information scheduling data communications on the primary cell. The UE search space monitor 925 may switch, during uplink transmission time intervals of the uplink-downlink configuration, from monitoring the UE-specific search spaces of the secondary cell to monitoring UE-specific search spaces of the primary cell for the control information scheduling the data communications on the primary cell.

Transmitter 935 may transmit signals generated by other components of the device 905. In some examples, the transmitter 935 may be collocated with a receiver 910 in a transceiver module. For example, the transmitter 935 may be an example of aspects of the transceiver 1120 or 1220 as described with reference to FIGS. 11 and 12. The transmitter 935 may utilize a single antenna or a set of antennas.

Figure 10:
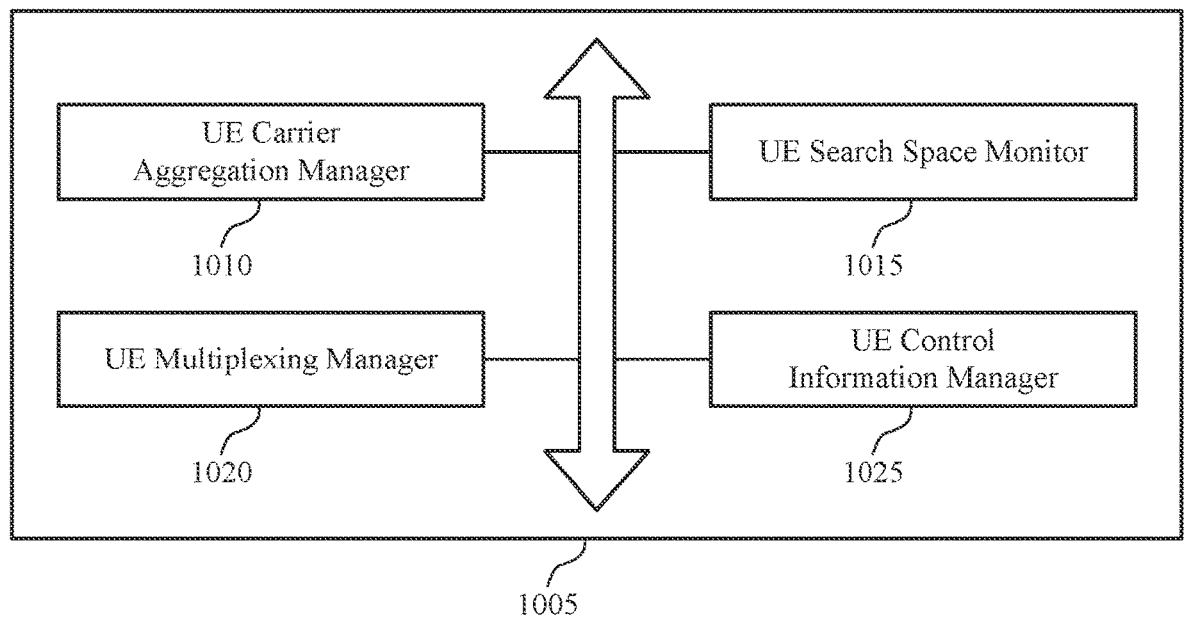
FIG. 10 shows a diagram of a communications manager that supports providing cross-carrier scheduling control information for a primary cell via both a secondary cell and the primary cell in accordance with aspects of the present disclosure.

FIG. 10 shows a diagram 1000 of a UE communications manager 1005 that supports providing cross-carrier scheduling control information for a primary cell via both a secondary cell and the primary cell in accordance with aspects of the present disclosure. The UE communications manager 1005 may be an example of aspects of a UE communications manager 160, a UE communications manager 815, a UE communications manager 915, or a UE communications manager 1110 described herein. The UE communications manager 1005 may include a UE carrier aggregation manager 1010, a UE search space monitor 1015, a UE multiplexing manager 1020, and a UE control information manager 1025. Each of these modules may communicate, directly or indirectly, with one another (e.g., via one or more buses).

The UE carrier aggregation manager 1010 may identify that the UE is in carrier aggregation communication with a primary cell and a secondary cell, where the secondary cell is configured for TDD communications in accordance with an uplink-downlink configuration.

In some examples, the UE carrier aggregation manager 1010 may configure a UE to communicate with a primary cell and a secondary cell of the base station via carrier aggregation, where the secondary cell is configured for time division duplex communications in accordance with an uplink-downlink configuration.

In some cases, the data communications on the primary cell are over either a physical downlink shared channel or a physical uplink shared channel. In some cases, the primary cell is a DSS carrier and the secondary cell is a non-DSS carrier. In some cases, the primary cell is shared between a first RAT and a second RAT. In some cases, the primary cell is a PCell or a PSCell. In some cases, the data communications on the primary cell are over either a PDSCH or a PUSCH.

The UE search space monitor 1015 may monitor, during downlink transmission time intervals of the uplink-downlink configuration, UE-specific search spaces of the secondary cell for control information scheduling data communications on the primary cell. In some examples, the UE search space monitor 1015 may monitor the UE-specific search spaces of the primary cell for the control information in accordance with a PDCCH monitoring occasion of the secondary cell or the primary cell. In some examples, the UE search space monitor 1015 may monitor the UE-specific search spaces of the secondary cell in accordance with a PDCCH monitoring occasion of the primary cell or the secondary cell.

In some examples, the UE search space monitor 1015 may switch, during uplink transmission time intervals of the uplink-downlink configuration, from monitoring the UE-specific search spaces of the secondary cell to monitoring UE-specific search spaces of the primary cell for the control information scheduling the data communications on the primary cell.

In some cases, the control information is available to be monitored by the UE via only the primary cell during the uplink transmission time intervals of the uplink-downlink configuration. In some other cases, the control information is available to be monitored by the UE via both the primary cell and the secondary cell during the downlink transmission time intervals of the uplink-downlink configuration. In some cases, the control information is available to be monitored by the UE via at least the secondary cell during non-uplink transmission time intervals of the uplink-downlink configuration.

In some examples, the UE multiplexing manager 1020 may receive the uplink-downlink configuration as either a common TDD uplink-downlink configuration or a dedicated TDD uplink-downlink configuration. In some cases, the primary cell is configured for either TDD or FDD communications.

Figure 11:
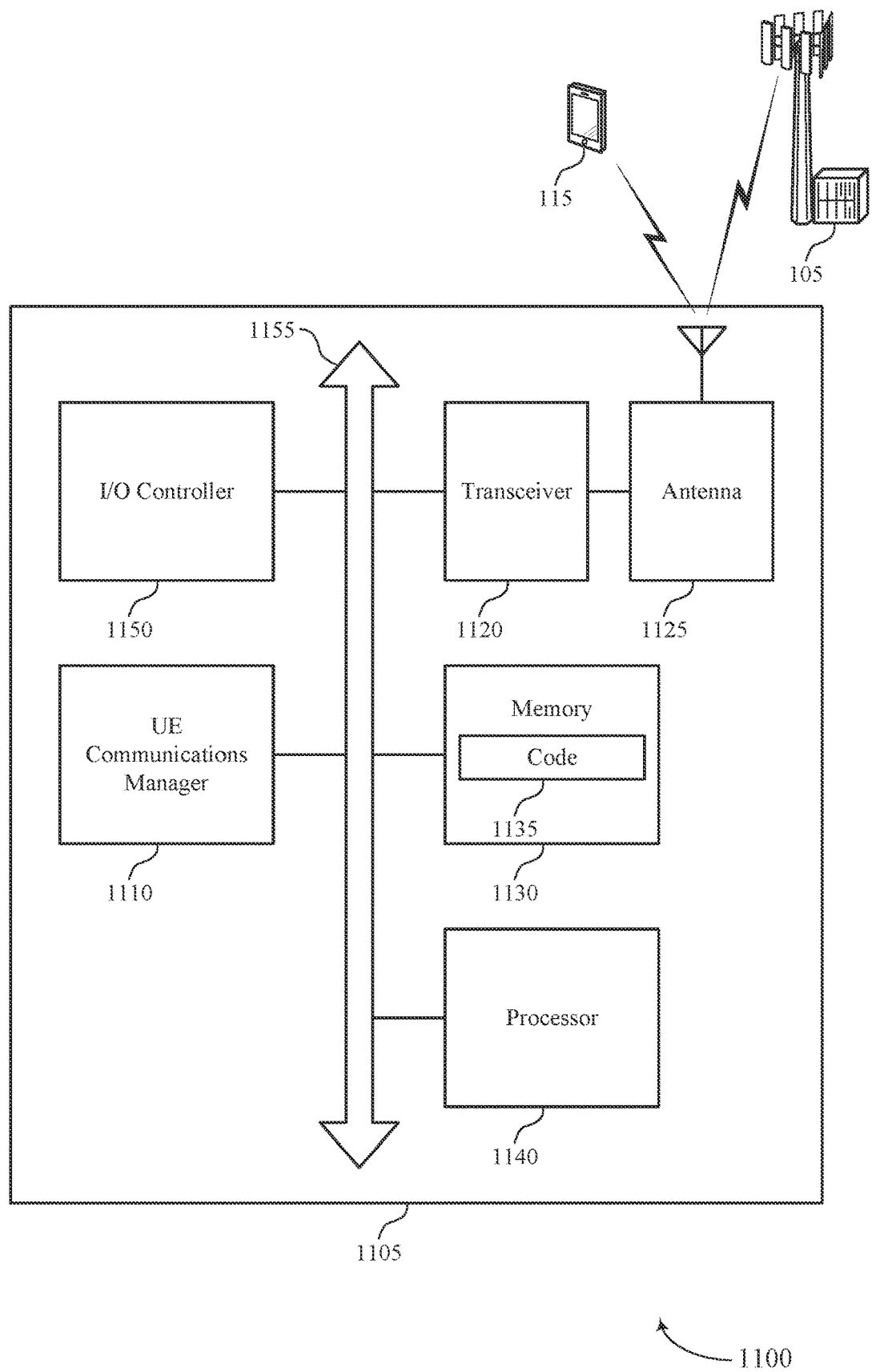
FIG. 11 shows a diagram of a system including a device that supports providing cross-carrier scheduling control information for a primary cell via both a secondary cell and the primary cell in accordance with aspects of the present disclosure.

FIG. 11 shows a diagram of a system 1100 including a device 1105 that supports providing cross-carrier scheduling control information for a primary cell via both a secondary cell and the primary cell in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, a transceiver 1120, an antenna 1125, memory 1130, a processor 1140, and an I/O controller 1150. These components may be in electronic communication via one or more buses (e.g., bus 1155).

The UE communications manager 1110 may identify that the UE is in carrier aggregation communication with a primary cell and a secondary cell, where the secondary cell is configured for time division duplex communications in accordance with an uplink-downlink configuration, monitor, during downlink transmission time intervals of the uplink-downlink configuration, UE-specific search spaces of the secondary cell for control information scheduling data communications on the primary cell, and switch, during uplink transmission time intervals of the uplink-downlink configuration, from monitoring the UE-specific search spaces of the secondary cell to monitoring UE-specific search spaces of the primary cell for the control information scheduling the data communications on the primary cell.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting providing cross-carrier scheduling control information for a primary cell via both a secondary cell and the primary cell).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
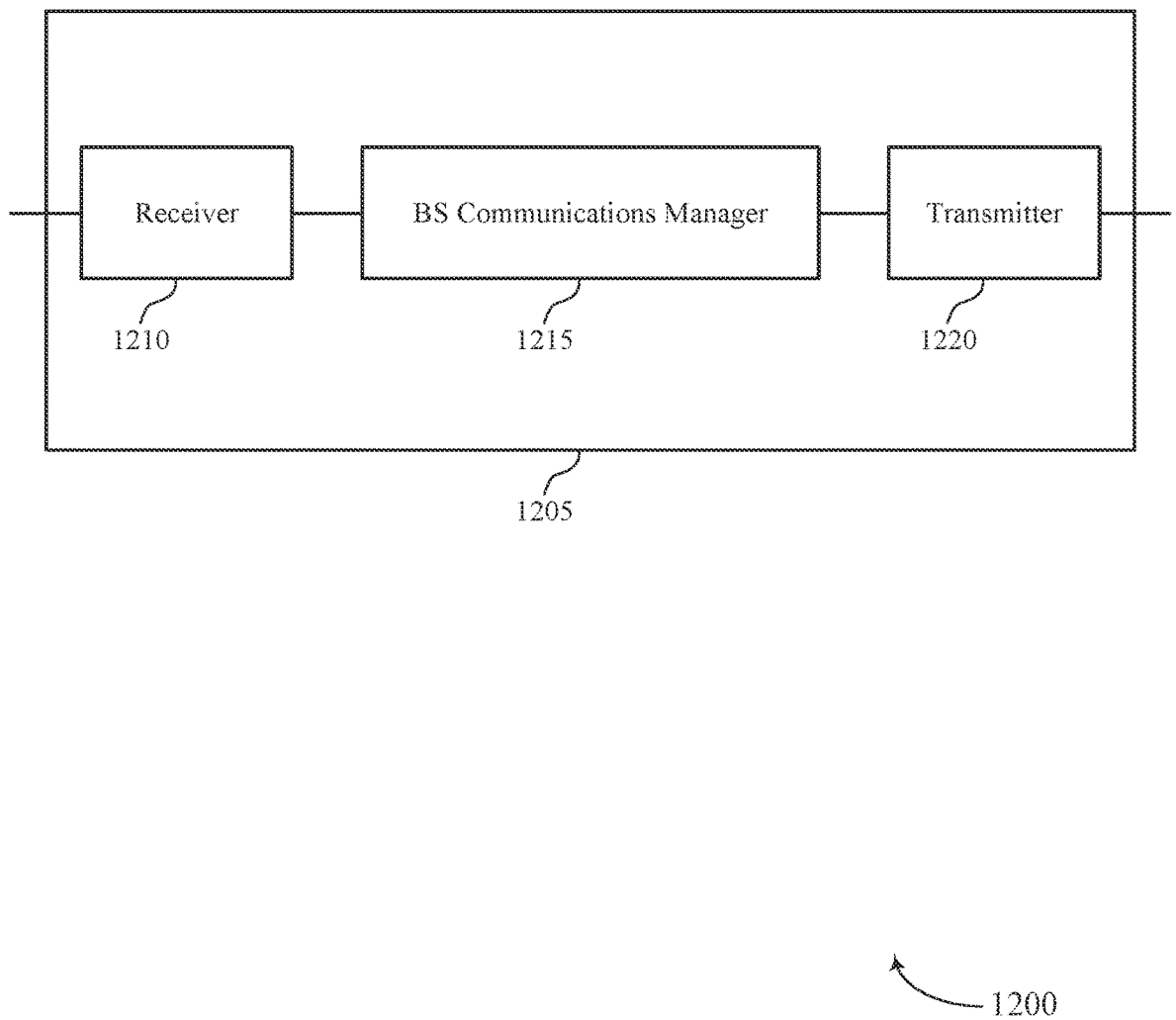
FIGS. 12 and 13 show diagrams of devices that support providing cross-carrier scheduling control information for a primary cell via both a secondary cell and the primary cell in accordance with aspects of the present disclosure.

FIG. 12 shows a diagram 1200 of a device 1205 that supports providing cross-carrier scheduling control information for a primary cell via both a secondary cell and the primary cell in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to providing cross-carrier scheduling control information for a primary cell via both a secondary cell and the primary cell, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1315 may be an example of aspects of the base station communications manager 170 as described herein. The base station communications manager 1215 may configure a UE to communicate with a primary cell and a secondary cell of the base station via carrier aggregation, where the secondary cell is configured for TDD communications in accordance with an uplink-downlink configuration.

The base station communications manager 1215 may transmit control information to the UE during downlink transmission time intervals of the uplink-downlink configuration via the secondary cell, the control information being transmitted during UE-specific search spaces of the secondary cell and scheduling data communications on the primary cell. The base station communications manager 1215 may transmit the control information to the UE during uplink transmission time intervals of the uplink-downlink configuration via the primary cell, the control information being transmitted during UE-specific search spaces of the primary cell and scheduling the data communications on the primary cell. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
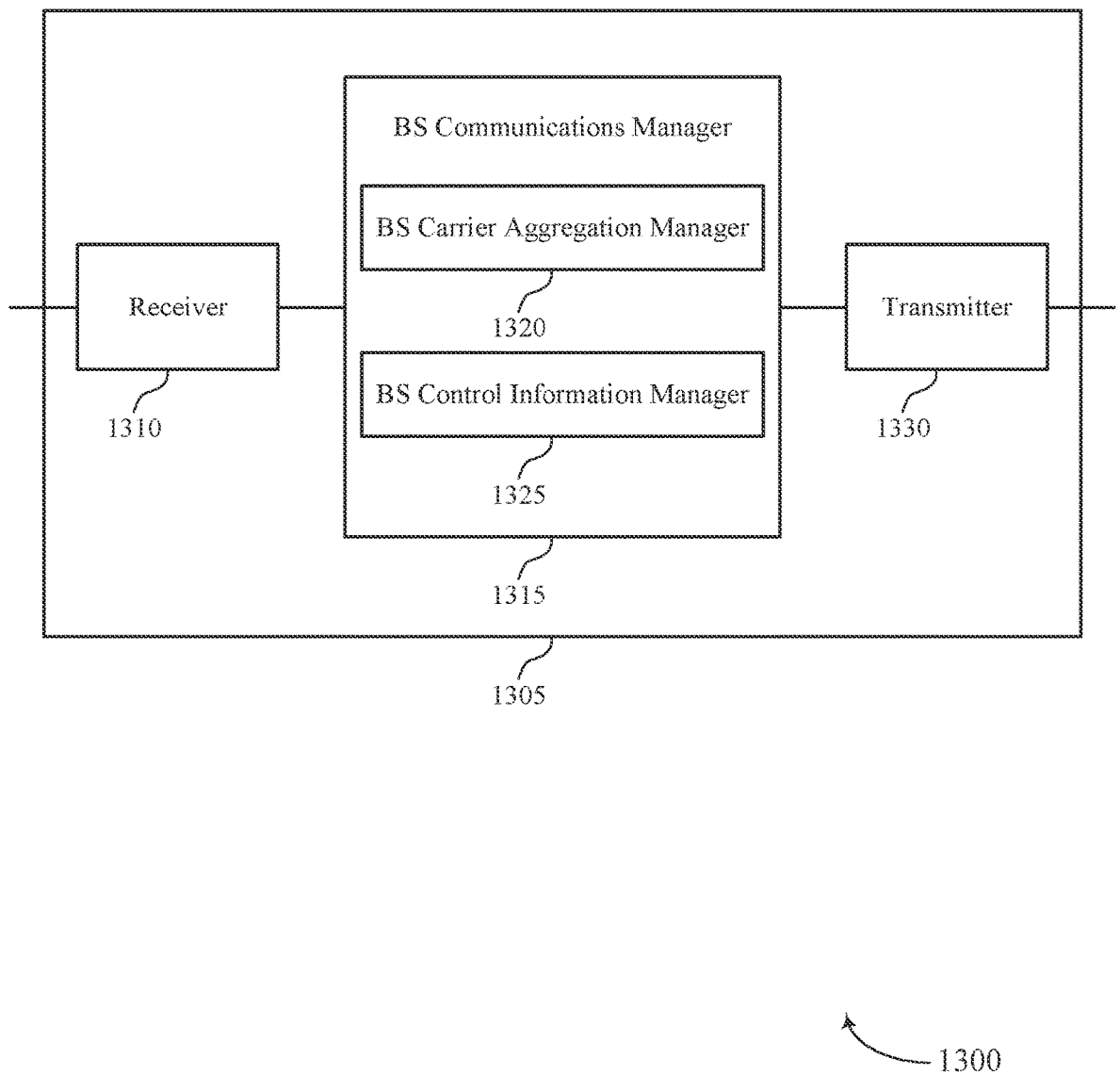

FIG. 13 shows a diagram 1300 of a device 1305 that supports providing cross-carrier scheduling control information for a primary cell via both a secondary cell and the primary cell in accordance with aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to providing cross-carrier scheduling control information for a primary cell via both a secondary cell and the primary cell, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 or 170 as described herein. The base station communications manager 1315 may include a base station carrier aggregation manager 1320 and a base station control information manager 1325. The base station communications manager 1315 may be an example of aspects of the base station communications manager 1510 described herein.

The base station carrier aggregation manager 1320 may configure a UE to communicate with a primary cell and a secondary cell of the base station via carrier aggregation, where the secondary cell is configured for TDD communications in accordance with an uplink-downlink configuration.

The base station control information manager 1325 may transmit control information to the UE during downlink TTIs of the uplink-downlink configuration via the secondary cell, the control information being transmitted during UE-specific search spaces of the secondary cell and scheduling data communications on the primary cell. The base station control information manager 1325 may transmit the control information to the UE during uplink TTIs of the uplink-downlink configuration via the primary cell, the control information being transmitted during UE-specific search spaces of the primary cell and scheduling the data communications on the primary cell.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
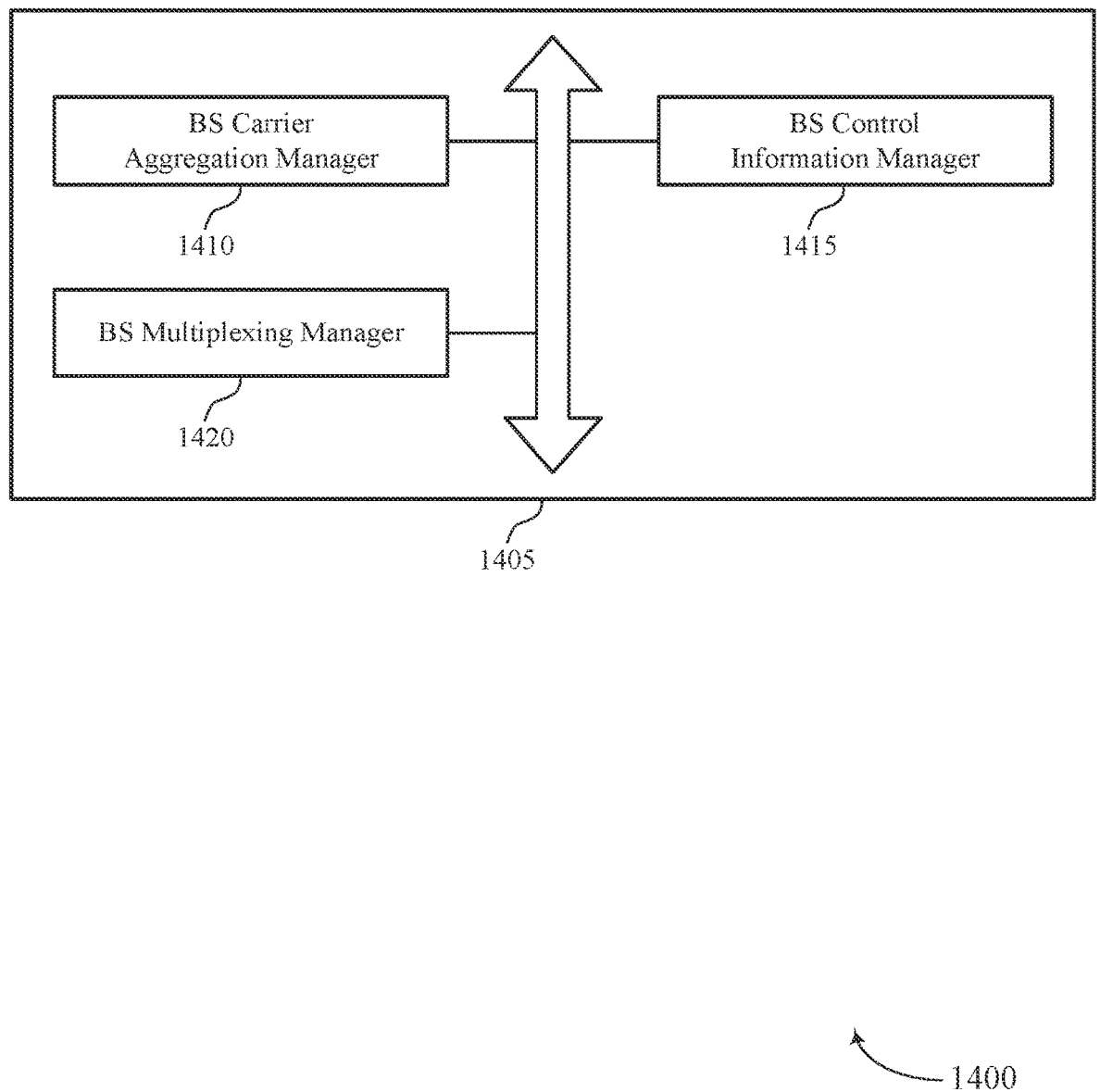
FIG. 14 shows a diagram of a communications manager that supports providing cross-carrier scheduling control information for a primary cell via both a secondary cell and the primary cell in accordance with aspects of the present disclosure.

FIG. 14 shows a diagram 1400 of a base station communications manager 1405 that supports providing cross-carrier scheduling control information for a primary cell via both a secondary cell and the primary cell in accordance with aspects of the present disclosure. The base station communications manager 1405 may be an example of aspects of a base station communications manager 170, 1215, 1315, or 1510 described herein. The base station communications manager 1405 may include a base station carrier aggregation manager 1410, a base station control information manager 1415, and a base station multiplexing manager 1420. Each of these modules may communicate, directly or indirectly, with one another (e.g., via one or more buses).

The base station carrier aggregation manager 1410 may configure a UE to communicate with a primary cell and a secondary cell of the base station via carrier aggregation, where the secondary cell is configured for TDD communications in accordance with an uplink-downlink configuration.

In some cases, the data communications on the primary cell are over either a physical downlink shared channel or a physical uplink shared channel. In some cases, the primary cell is a PSCell or a PSCell. In some cases, the primary cell is a DSS carrier and the secondary cell is a non-DSS carrier. In some cases, the primary cell is shared between a first RAT and a second RAT.

The base station control information manager 1415 may transmit control information to the UE during downlink transmission time intervals of the uplink-downlink configuration via the secondary cell, the control information being transmitted during UE-specific search spaces of the secondary cell and scheduling data communications on the primary cell. In some examples, the base station control information manager 1415 may transmit the control information to the UE during uplink transmission time intervals of the uplink-downlink configuration via the primary cell, the control information being transmitted during UE-specific search spaces of the primary cell and scheduling the data communications on the primary cell. In some examples, the base station control information manager 1415 may cause a transmitter to transmit the control information.

In some examples, the base station control information manager 1415 may transmit the control information to the UE via only the primary cell during the uplink transmission time intervals of the uplink-downlink configuration. In some examples, the base station control information manager 1415 may transmit the control information to the UE via both the primary cell and the secondary cell during the downlink transmission time intervals of the uplink-downlink configuration.

In some examples, the base station control information manager 1415 may transmit the control information to the UE via at least the secondary cell during non-uplink transmission time intervals of the uplink-downlink configuration. In some examples, the base station control information manager 1415 may transmit the uplink-downlink configuration as either a common time division duplex (TDD) uplink-downlink configuration or a dedicated TDD uplink-downlink configuration.

In some examples, the base station control information manager 1415 may transmit the control information during the UE-specific search spaces of the primary cell in accordance with a PDCCH monitoring occasion of the secondary cell. In some examples, the base station control information manager 1415 may transmit the control information during the UE-specific search spaces of the secondary cell in accordance with a PDCCH monitoring occasion of the primary cell.

In some examples, the base station control information manager 1415 may transmit the control information during the UE-specific search spaces of the primary cell in accordance with a PDCCH monitoring occasion of the primary cell.

In some examples, the base station control information manager 1415 may transmit the control information during the UE-specific search spaces of the secondary cell in accordance with a PDCCH monitoring occasion of the secondary cell.

The base station multiplexing manager 1420 may configure the UE to operate with carrier aggregation communications. In some examples, the base station multiplexing manager 1420 may configure the primary cell for either TDD or FDD communications and the secondary cell for TDD communications.

Figure 15:
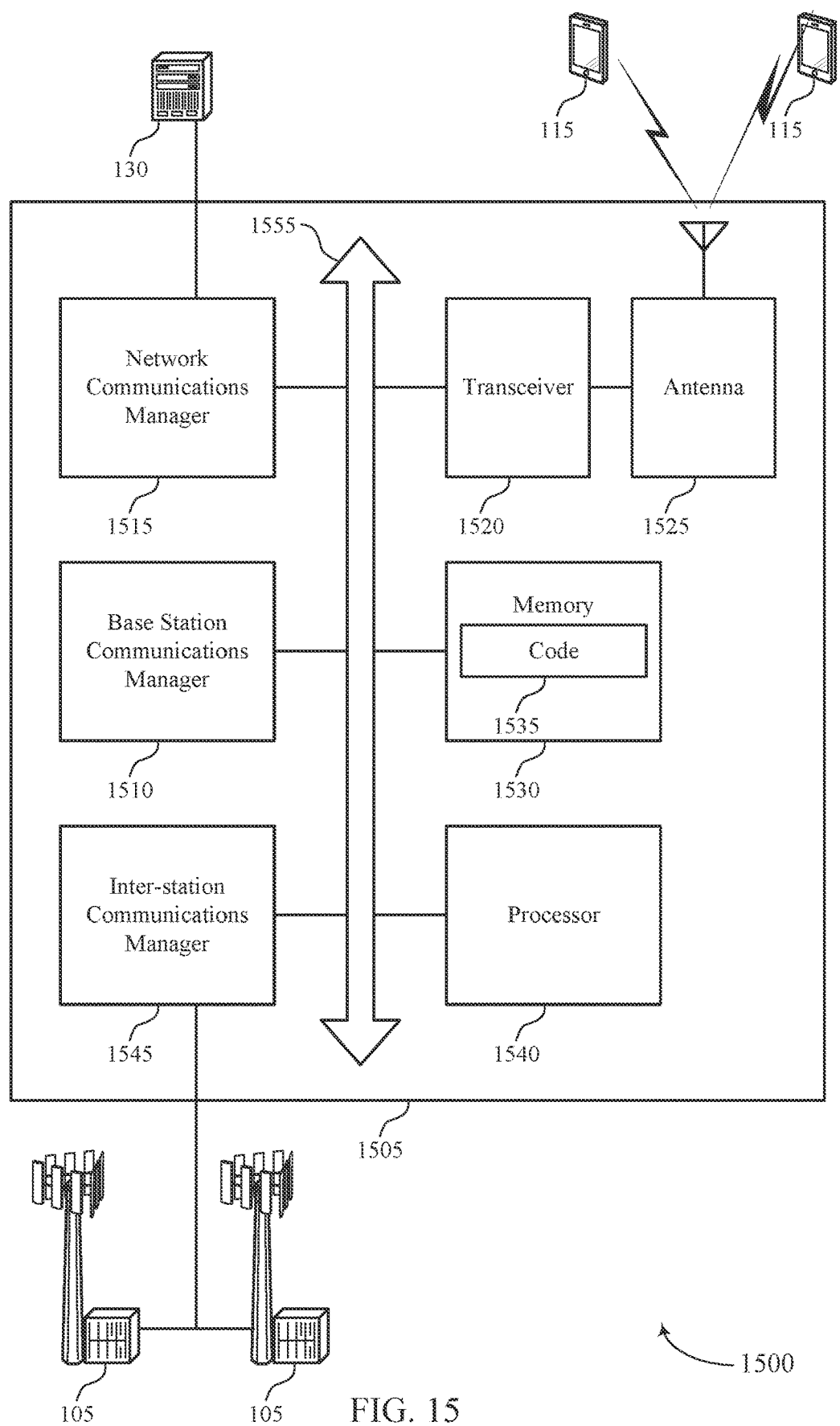
FIG. 15 shows a diagram of a system including a device that supports providing cross-carrier scheduling control information for a primary cell via both a secondary cell and the primary cell in accordance with aspects of the present disclosure.

FIG. 15 shows a diagram of a system 1500 including a device 1505 that supports providing cross-carrier scheduling control information for a primary cell via both a secondary cell and the primary cell in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network base station communications manager 1515, a transceiver 1520, an antenna 1525, memory 1530, a processor 1540, and an inter-station base station communications manager 1545. These components may be in electronic communication via one or more buses (e.g., bus 1550).

The base station communications manager 1510 may configure a UE to communicate with a primary cell and a secondary cell of the base station via carrier aggregation, where the secondary cell is configured for time division duplex communications in accordance with an uplink-downlink configuration. The base station communications manager 1510 may transmit control information to the UE during downlink transmission time intervals of the uplink-downlink configuration via the secondary cell, the control information being transmitted during UE-specific search spaces of the secondary cell and scheduling data communications on the primary cell. The base station communications manager 1510 may transmit the control information to the UE during uplink transmission time intervals of the uplink-downlink configuration via the primary cell, the control information being transmitted during UE-specific search spaces of the primary cell and scheduling the data communications on the primary cell.

The network base station communications manager 1515 may manage communications with the core network (e.g., via one or more wired backhaul links). For example, the network base station communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting providing cross-carrier scheduling control information for a primary cell via both a secondary cell and the primary cell).

The inter-station base station communications manager 1545 may manage communications with other base station 105 and may include a controller or scheduler for controlling communications with UEs 115 in cooperation with other base stations 105. For example, the inter-station base station communications manager 1545 may coordinate scheduling for transmissions to UEs 115 for various interference mitigation techniques such as beamforming or joint transmission. In some examples, the inter-station base station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

FIG. 15 shows a diagram of a system 1500 including a device 1505 that supports providing cross-carrier scheduling control information for a primary cell via both a secondary cell and the primary cell in accordance with aspects of the present disclosure. The device 1505 may be an example of or include the components of device 805, device 905, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1555).

The communications manager 1510 may be an example of the base station communications manager 170 of FIG. 1. The communications manager 1510 may also configure a UE to communicate with a primary cell and a secondary cell of the base station via carrier aggregation, where the secondary cell is configured for time division duplex communications in accordance with an uplink-downlink configuration, transmit control information to the UE during downlink transmission time intervals of the uplink-downlink configuration via the secondary cell, the control information being transmitted during UE-specific search spaces of the secondary cell and scheduling data communications on the primary cell, and transmit the control information to the UE during uplink transmission time intervals of the uplink-downlink configuration via the primary cell, the control information being transmitted during UE-specific search spaces of the primary cell and scheduling the data communications on the primary cell.

Network communications manager 1515 may manage communications with the core network (e.g., via one or more wired backhaul links). For example, the network communications manager 1515 may manage the transfer of data communications for client devices, such as one or more UEs 115.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting providing cross-carrier scheduling control information for a primary cell via both a secondary cell and the primary cell).

Inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
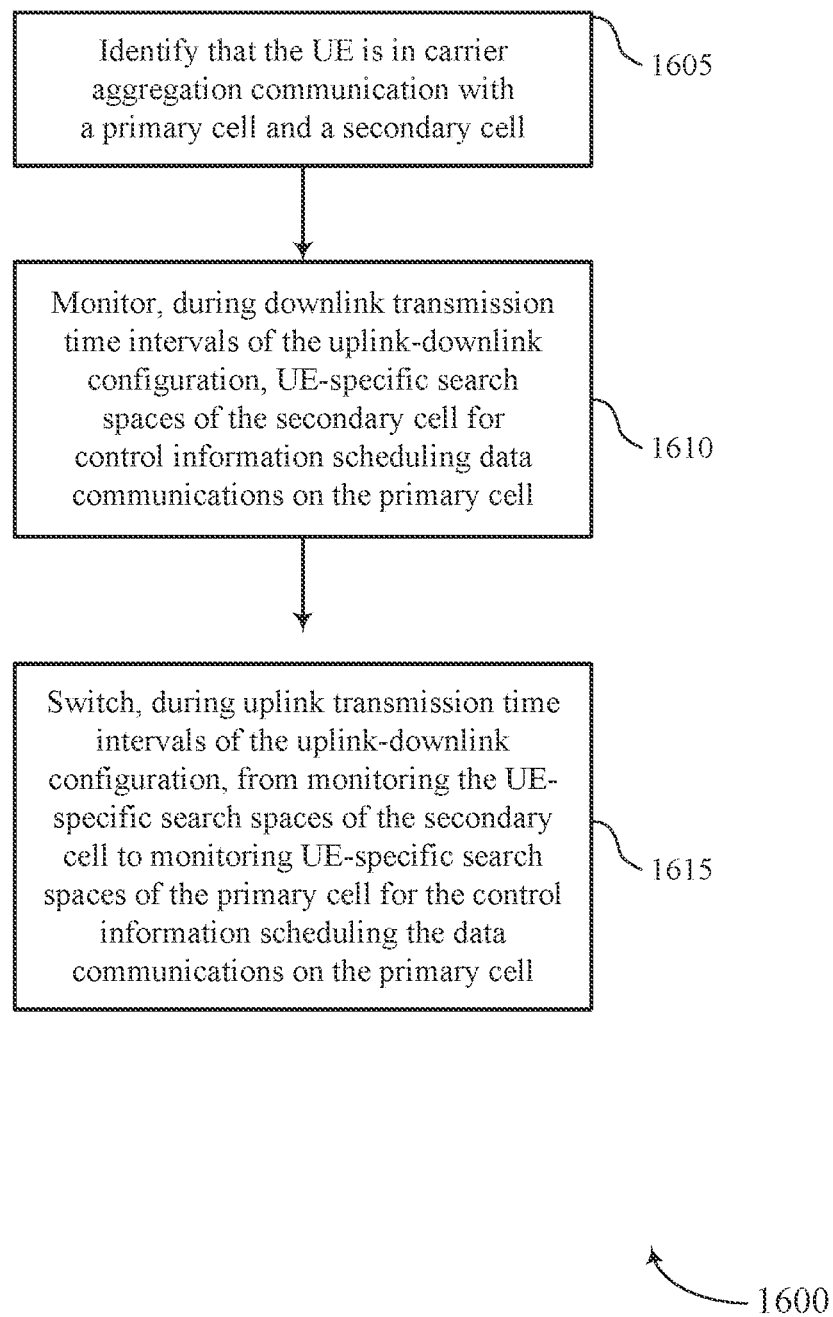
FIGS. 16 through 18 show flowcharts illustrating methods that support providing cross-carrier scheduling control information for a primary cell via both a secondary cell and the primary cell in accordance with aspects of the present disclosure.

FIG. 16 shows a flowchart illustrating a method 1600 that supports providing cross-carrier scheduling control information for a primary cell via both a secondary cell and the primary cell in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may identify that the UE is in carrier aggregation communication with a primary cell and a secondary cell, where the secondary cell is configured for TDD communications in accordance with an uplink-downlink configuration. The operations of 1605 may be performed according to the methods described herein. In some examples, aspects of the operations of 1605 may be performed by a carrier aggregation manager as described with reference to FIGS. 8 through 11.

At 1610, the UE may monitor, during downlink transmission time intervals of the uplink-downlink configuration, UE-specific search spaces of the secondary cell for control information scheduling data communications on the primary cell. The operations of 1610 may be performed according to the methods described herein. In some examples, aspects of the operations of 1610 may be performed by a search space monitor as described with reference to FIGS. 8 through 11.

At 1615, the UE may switch, during uplink transmission time intervals of the uplink-downlink configuration, from monitoring the UE-specific search spaces of the secondary cell to monitoring UE-specific search spaces of the primary cell for the control information scheduling the data communications on the primary cell. The operations of 1615 may be performed according to the methods described herein. In some examples, aspects of the operations of 1615 may be performed by a search space monitor as described with reference to FIGS. 8 through 11.

Figure 17:
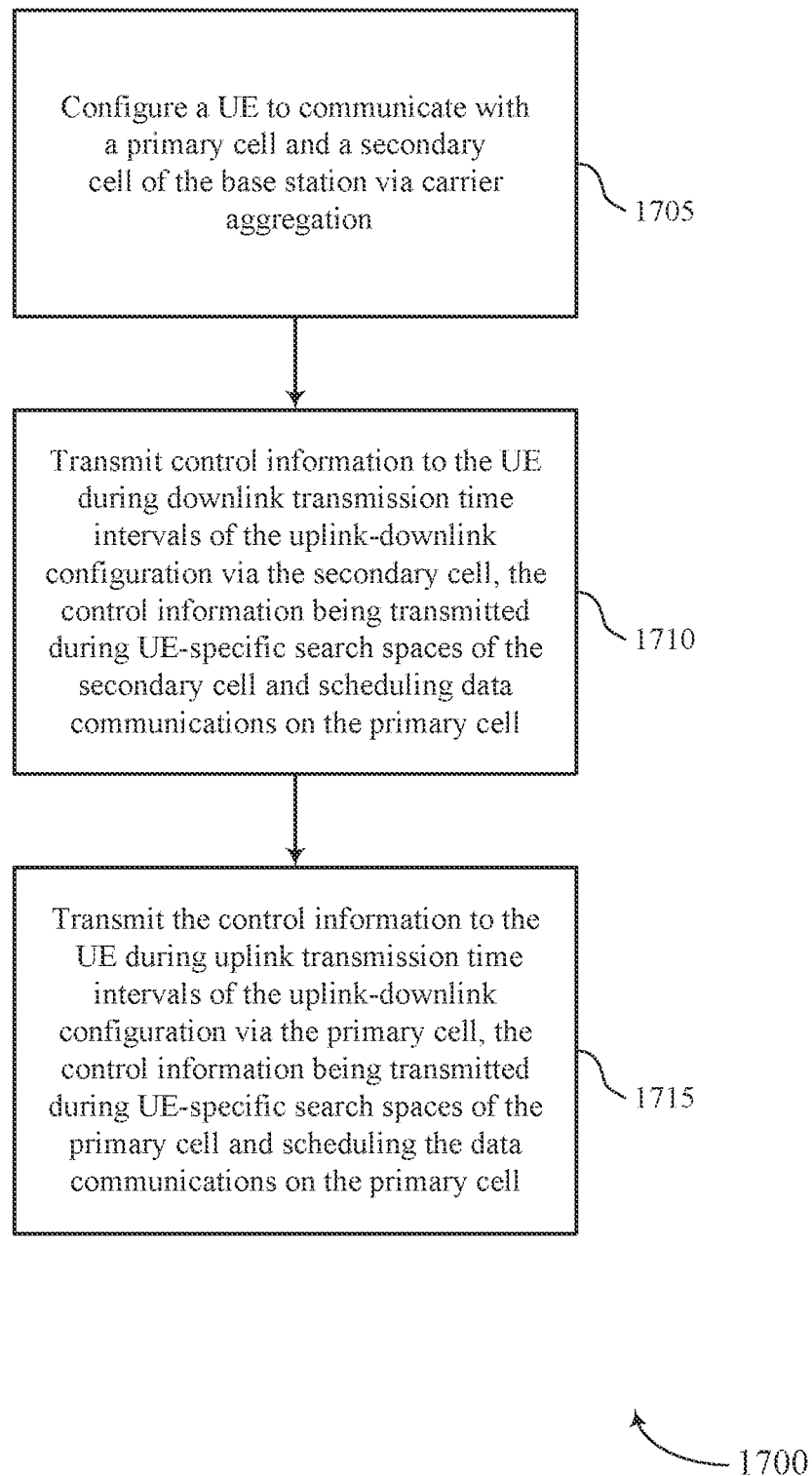

FIG. 17 shows a flowchart illustrating a method 1700 that supports providing cross-carrier scheduling control information for a primary cell via both a secondary cell and the primary cell in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may configure a UE to communicate with a primary cell and a secondary cell of the base station via carrier aggregation, where the secondary cell is configured for time division duplex communications in accordance with an uplink-downlink configuration. The operations of 1705 may be performed according to the methods described herein. In some examples, aspects of the operations of 1705 may be performed by a carrier aggregation manager as described with reference to FIGS. 12 through 15.

At 1710, the base station may transmit control information to the UE during downlink transmission time intervals of the uplink-downlink configuration via the secondary cell, the control information being transmitted during UE-specific search spaces of the secondary cell and scheduling data communications on the primary cell. The operations of 1710 may be performed according to the methods described herein. In some examples, aspects of the operations of 1710 may be performed by a control information manager as described with reference to FIGS. 12 through 15.

At 1715, the base station may transmit the control information to the UE during uplink transmission time intervals of the uplink-downlink configuration via the primary cell, the control information being transmitted during UE-specific search spaces of the primary cell and scheduling the data communications on the primary cell. The operations of 1715 may be performed according to the methods described herein. In some examples, aspects of the operations of 1715 may be performed by a control information manager as described with reference to FIGS. 12 through 15.

Figure 18:
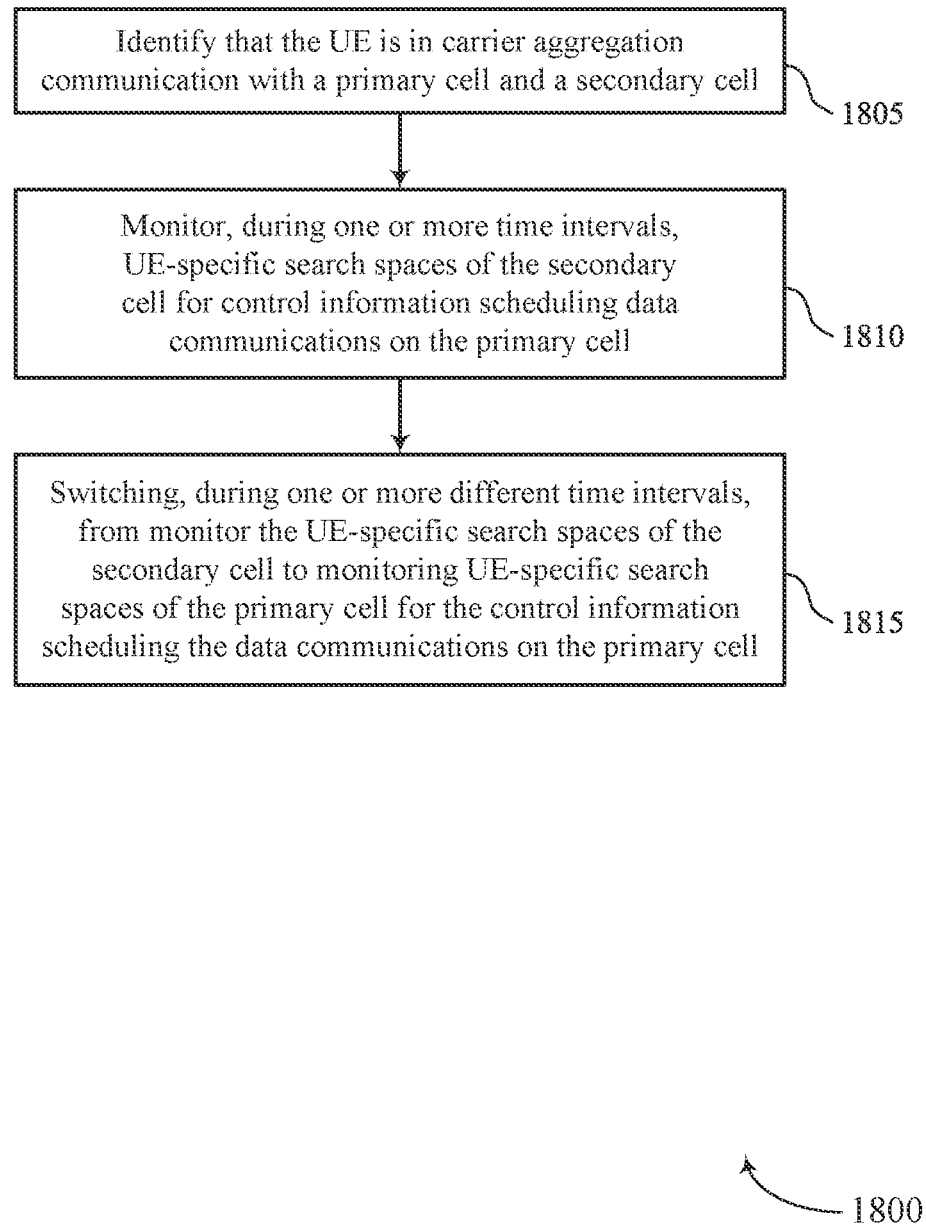

FIG. 18 shows a flowchart illustrating a method 1800 that supports providing cross-carrier scheduling control information for a primary cell via both a secondary cell and the primary cell in accordance with aspects of the present disclosure. The operations of the method 1800 may be implemented by a UE or its components as described herein. For example, the operations of the method 1800 may be performed by a UE 115 as described with reference to FIGS. 8 through 11. In some examples, a UE may execute a set of instructions to control the functional elements of the UE to perform the described functions. Additionally, or alternatively, the UE may perform aspects of the described functions using special-purpose hardware.

At 1805, the method may include identifying that the UE is in carrier aggregation communication with a primary cell and a secondary cell. The operations of 1805 may be performed in accordance with examples as disclosed herein. In some examples, aspects of the operations of 1605 may be performed by a carrier aggregation manager as described with reference to FIGS. 8 through 11.

At 1810, the method may include monitoring, during one or more time intervals, UE-specific search spaces of the secondary cell for control information scheduling data communications on the primary cell. The operations of 1810 may be performed in accordance with examples as disclosed herein. In some examples, aspects of the operations of 1610 may be performed by a search space monitor as described with reference to FIGS. 8 through 11.

At 1815, the method may include switching, during one or more different time intervals, from monitoring the UE-specific search spaces of the secondary cell to monitoring UE-specific search spaces of the primary cell for the control information scheduling the data communications on the primary cell. In some examples, aspects of the operations of 1615 may be performed by a search space monitor as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying that the UE is in carrier aggregation communication with a primary cell and a secondary cell; monitoring, during one or more time intervals, UE-specific search spaces of the secondary cell for control information scheduling data communications on the primary cell; and switching, during one or more different time intervals, from monitoring the UE-specific search spaces of the secondary cell to monitoring UE-specific search spaces of the primary cell for the control information scheduling the data communications on the primary cell.

Aspect 2: The method of aspect 1, wherein the control information is available to be monitored by the UE via only the primary cell during the one or more different time intervals.

Aspect 3: The method of any of aspects 1 through 2, further comprising: monitoring the UE-specific search spaces of the primary cell for the control information in accordance with a PDCCH monitoring occasion of the secondary cell.

Aspect 4: The method of any of aspects 1 through 3, wherein monitoring the UE-specific search spaces of the secondary cell comprises: monitoring the UE-specific search spaces of the secondary cell in accordance with a PDCCH monitoring occasion of the primary cell.

Aspect 5: The method of any of aspects 1 through 4, further comprising: monitoring the UE-specific search spaces of the primary cell for the control information in accordance with a PDCCH monitoring occasion of the primary cell.

Aspect 6: The method of any of aspects 1 through 5, wherein monitoring the UE-specific search spaces of the secondary cell comprises: monitoring the UE-specific search spaces of the secondary cell in accordance with a PDCCH monitoring occasion of the secondary cell.

Aspect 7: The method of any of aspects 1 through 6, wherein the control information is available to be monitored by the UE via both the primary cell and the secondary cell during the one or more time intervals.

Aspect 8: The method of any of aspects 1 through 7, wherein the control information is available to be monitored by the UE via at least the secondary cell during non-uplink time intervals.

Aspect 9: The method of any of aspects 1 through 8, wherein the data communications on the primary cell are over either a physical downlink shared channel or a physical uplink shared channel.

Aspect 10: The method of any of aspects 1 through 9, wherein the secondary cell is configured for time division duplex communications in accordance with an uplink-downlink configuration.

Aspect 11: The method of aspect 10, wherein the one or more time intervals are downlink transmission time intervals of the uplink-downlink configuration, and the one or more different time intervals are uplink transmission time intervals of the uplink-downlink configuration.

Aspect 12: The method of any of aspects 10 through 11, further comprising: receiving the uplink-downlink configuration as either a common time division duplex (TDD) uplink-downlink configuration or a dedicated TDD uplink-downlink configuration.

Aspect 13: The method of any of aspects 1 through 12, wherein the primary cell is configured for either time division duplex (TDD) or frequency division duplex (FDD) communications.

Aspect 14: The method of any of aspects 1 through 13, wherein the primary cell is a dynamic spectrum sharing (DSS) carrier and the secondary cell is a non-DSS carrier.

Aspect 15: The method of aspect 14, wherein the primary cell is shared between a first RAT and a second RAT.

Aspect 16: The method of any of aspects 1 through 15, wherein the primary cell is a primary second cell (PSCell).

Aspect 17: An apparatus for wireless communication at a UE, comprising a processor; memory coupled with the processor; and instructions stored in the memory and executable by the processor to cause the apparatus to perform a method of any of aspects 1 through 16.

Aspect 18: An apparatus for wireless communication at a UE, comprising at least one means for performing a method of any of aspects 1 through 16.

Aspect 19: A non-transitory computer-readable medium storing code for wireless communication at a UE, the code comprising instructions executable by a processor to perform a method of any of aspects 1 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication implemented by a user equipment (UE), comprising:
    identifying that the UE is in carrier aggregation communication with a primary cell and a secondary cell;
    monitoring, during one or more time intervals, UE-specific search spaces of the secondary cell for control information scheduling data communications on the primary cell; and
    switching, during one or more different time intervals, from monitoring the UE-specific search spaces of the secondary cell to monitoring UE-specific search spaces of the primary cell for the control information scheduling the data communications on the primary cell.

2. The method of claim 1, wherein the control information is available to be monitored by the UE via only the primary cell during the one or more different time intervals.

3. The method of claim 1, further comprising:
    monitoring the UE-specific search spaces of the primary cell for the control information in accordance with a physical downlink control channel (PDCCH) monitoring occasion of the secondary cell.

4. The method of claim 1, wherein the monitoring the UE-specific search spaces of the secondary cell comprises:
    monitoring the UE-specific search spaces of the secondary cell in accordance with a physical downlink control channel (PDCCH) monitoring occasion of the primary cell.

5. The method of claim 1, further comprising:
    monitoring the UE-specific search spaces of the primary cell for the control information in accordance with a physical downlink control channel (PDCCH) monitoring occasion of the primary cell.

6. The method of claim 1, wherein the monitoring the UE-specific search spaces of the secondary cell comprises:
    monitoring the UE-specific search spaces of the secondary cell in accordance with a physical downlink control channel (PDCCH) monitoring occasion of the secondary cell.

7. The method of claim 1, wherein the control information is available to be monitored by the UE via both the primary cell and the secondary cell during the one or more time intervals.

8. The method of claim 1, wherein the control information is available to be monitored by the UE via at least the secondary cell during non-uplink time intervals.

9. The method of claim 1, wherein the data communications on the primary cell are over either a physical downlink shared channel or a physical uplink shared channel.

10. The method of claim 1, wherein the secondary cell is configured for time division duplex communications in accordance with an uplink-downlink configuration.

11. The method of claim 10, wherein the one or more time intervals are downlink transmission time intervals of the uplink-downlink configuration, and wherein the one or more different time intervals are uplink transmission time intervals of the uplink-downlink configuration.

12. The method of claim 10, further comprising:
    receiving the uplink-downlink configuration as either a common time division duplex (TDD) uplink-downlink configuration or a dedicated TDD uplink-downlink configuration.

13. The method of claim 1, wherein the primary cell is configured for either time division duplex (TDD) or frequency division duplex (FDD) communications.

14. The method of claim 1, wherein the primary cell is a dynamic spectrum sharing (DSS) carrier and the secondary cell is a non-DSS carrier.

15. The method of claim 14, wherein the primary cell is shared between a first radio access technology (RAT) and a second RAT.

16. The method of claim 1, wherein the primary cell is a primary second cell (PSCell).

17. An apparatus for wireless communication at a user equipment (UE), comprising:
    one or more memories storing processor-executable code; and
    one or more processors coupled with the one or more memories and operable to execute the code to cause the one or more processors, individually or collectively, to:
        identify that the UE is in carrier aggregation communication with a primary cell and a secondary cell;
        monitor, during one or more time intervals, UE-specific search spaces of the secondary cell for control information scheduling data communications on the primary cell; and
        switch, during one or more different time intervals, from monitoring the UE-specific search spaces of the secondary cell to monitoring UE-specific search spaces of the primary cell for the control information scheduling the data communications on the primary cell.

18. The apparatus of claim 17, wherein the control information is available to be monitored by the UE via only the primary cell during the one or more different time intervals.

19. The apparatus of claim 17, wherein the one or more processors are further operable to execute the code to cause the one or more processors, individually or collectively, to:

monitor the UE-specific search spaces of the primary cell for the control information in accordance with a physical downlink control channel (PDCCH) monitoring occasion of the secondary cell.

20. The apparatus of claim 17, wherein the one or more processors to monitor the UE-specific search spaces of the secondary cell are further executable to:
monitor the UE-specific search spaces of the secondary cell in accordance with a physical downlink control channel (PDCCH) monitoring occasion of the primary cell.

21. The apparatus of claim 17, wherein the one or more processors are further operable to execute the code to cause the one or more processors, individually or collectively, to:
monitor the UE-specific search spaces of the primary cell for the control information in accordance with a physical downlink control channel (PDCCH) monitoring occasion of the primary cell.

22. The apparatus of claim 17, wherein the one or more processors coupled with the one or more memories and operable to execute the code to further cause the one or more processors, individually or collectively, to:
monitor the UE-specific search spaces of the secondary cell in accordance with a physical downlink control channel (PDCCH) monitoring occasion of the secondary cell.

23. The apparatus of claim 17, wherein the control information is available to be monitored by the UE via both the primary cell and the secondary cell during the one or more time intervals.

24. The apparatus of claim 17, wherein the control information is available to be monitored by the UE via at least the secondary cell during non-uplink transmission time intervals.

25. The apparatus of claim 17, wherein the secondary cell is configured for time division duplex communications in accordance with an uplink-downlink configuration.

26. The apparatus of claim 17, wherein the one or more processors are further operable to execute the code to cause the one or more processors, individually or collectively, to:
receive an uplink-downlink configuration as either a common time division duplex (TDD) uplink-downlink configuration or a dedicated TDD uplink-downlink configuration.

27. The apparatus of claim 26, wherein the one or more time intervals are downlink transmission time intervals of the uplink-downlink configuration, and wherein the one or more different time intervals are uplink transmission time intervals of the uplink-downlink configuration.

28. The apparatus of claim 26, wherein the one or more processors are further operable to execute the code to cause the one or more processors, individually or collectively, to:
receive the uplink-downlink configuration as either a common time division duplex (TDD) uplink-downlink configuration or a dedicated TDD uplink-downlink configuration.

29. The apparatus of claim 17, wherein the data communications on the primary cell are over either a physical downlink shared channel or a physical uplink shared channel.

30. An apparatus for wireless communication at a user equipment (UE), comprising:
means for identifying that the UE is in carrier aggregation communication with a primary cell and a secondary cell;
means for monitoring, during one or more time intervals, UE-specific search spaces of the secondary cell for control information scheduling data communications on the primary cell; and
means for switching, during one or more different time intervals, from monitoring the UE-specific search spaces of the secondary cell to monitoring UE-specific search spaces of the primary cell for the control information scheduling the data communications on the primary cell.

31. A non-transitory computer-readable medium storing code for wireless communication at a user equipment (UE), the code comprising instructions executable by one or more processors to:
identify that the UE is in carrier aggregation communication with a primary cell and a secondary cell;
monitor, during one or more time intervals, UE-specific search spaces of the secondary cell for control information scheduling data communications on the primary cell; and
switch, during one or more different time intervals, from monitoring the UE-specific search spaces of the secondary cell to monitoring UE-specific search spaces of the primary cell for the control information scheduling the data communications on the primary cell.

* * * * *